US012749041B2

(12) United States Patent
Hekman et al.

(10) Patent No.: US 12,749,041 B2
(45) Date of Patent: Sep. 29, 2026

(54) SYSTEMS AND METHODS FOR IDENTIFYING EXCEPTIONS IN FEATURE DETECTION ANALYTICS

(71) Applicant: Brain Corporation, San Diego, CA (US)

(72) Inventors: Andrew Hekman, San Diego, CA (US); Mingwei Xu, San Diego, CA (US); Kiel Martin Groeniger, San Diego, CA (US)

(73) Assignee: Brain Corporation, San Diego, CA (US)

( * ) Notice: Subject to any disclaimer, the term of this patent is extended or adjusted under 35 U.S.C. 154(b) by 107 days.

(21) Appl. No.: 18/390,183

(22) Filed: Dec. 20, 2023

(65) Prior Publication Data

US 2024/0220921 A1 Jul. 4, 2024

Related U.S. Application Data

(60) Provisional application No. 63/435,653, filed on Dec. 28, 2022.

(51) Int. Cl.
*G06Q 10/087* (2023.01)
*G05B 19/4155* (2006.01)

(52) U.S. Cl.
CPC ....... *G06Q 10/087* (2013.01); *G05B 19/4155* (2013.01); *G05B 2219/50391* (2013.01)

(58) Field of Classification Search
CPC .............. G06Q 10/087; G05B 19/4155; G05B 2219/50391
See application file for complete search history.

(56) References Cited

U.S. PATENT DOCUMENTS

| | | | |
|---|---|---|---|
| 5,111,401 | A | 5/1992 | Everett, Jr. et al. |
| 5,696,675 | A | 12/1997 | Nakamura et al. |
| 5,758,298 | A | 5/1998 | Guldner |
| 5,793,900 | A | 8/1998 | Nourbakhsh et al. |
| 5,793,934 | A | 8/1998 | Bauer |

(Continued)

FOREIGN PATENT DOCUMENTS

| | | |
|---|---|---|
| EP | 1240562 B1 | 6/2004 |
| EP | 2343615 B1 | 10/2018 |

(Continued)

OTHER PUBLICATIONS

Basic Research Series: Optical Information Technology State-of-the-Art Report; Publication date 1993.

(Continued)

*Primary Examiner* — Garcia Ade
(74) *Attorney, Agent, or Firm* — Sidharth Kapoor; Pierson Ferdinand LLP

(57) ABSTRACT

Systems and methods for identifying exceptions in feature detection analytics include systems and methods configured to identify exceptions in product displays. In one exemplary embodiment, price tag mismatches are reported to a customer if certain criteria are met based on analytics from optical character recognition, image object detection, and reference catalogs/planograms. These price tag mismatches, for example, provide actionable insights for humans working alongside robots which can be quickly identified and resolved.

23 Claims, 15 Drawing Sheets

(56) References Cited

U.S. PATENT DOCUMENTS

| | | | |
|---|---|---|---|
| 6,667,592 B2 | 12/2003 | Jacobs et al. | |
| 7,170,252 B2 | 1/2007 | Maeki | |
| 7,502,065 B2 | 3/2009 | Nakahara | |
| 7,965,890 B2 | 6/2011 | Marcus et al. | |
| 8,185,239 B2 | 5/2012 | Teng et al. | |
| 8,300,890 B1 | 10/2012 | Gaikwad et al. | |
| 8,542,875 B2 | 9/2013 | Eswara | |
| 8,903,589 B2 | 12/2014 | Sofman et al. | |
| 8,918,241 B2 | 12/2014 | Chen et al. | |
| 8,948,913 B2 | 2/2015 | Choi et al. | |
| 8,954,191 B2 | 2/2015 | Yi et al. | |
| 9,076,214 B2 | 7/2015 | Tsutsumi | |
| 9,122,948 B1 | 9/2015 | Zhu et al. | |
| 9,174,672 B2 | 11/2015 | Zeng et al. | |
| 9,192,869 B2 | 11/2015 | Moriya | |
| 9,205,886 B1 * | 12/2015 | Hickman | G05D 1/0246 |
| 9,208,384 B2 | 12/2015 | Conwell et al. | |
| 9,216,745 B2 | 12/2015 | Beardsley et al. | |
| 9,233,472 B2 | 1/2016 | Angle et al. | |
| 9,286,810 B2 | 3/2016 | Eade et al. | |
| 9,304,001 B2 | 4/2016 | Park et al. | |
| 9,380,922 B2 | 7/2016 | Duffley et al. | |
| 9,400,501 B2 | 7/2016 | Schnittman | |
| 9,404,756 B2 | 8/2016 | Fong et al. | |
| 9,519,289 B2 | 12/2016 | Munich et al. | |
| 9,534,899 B2 | 1/2017 | Gutmann et al. | |
| 9,538,892 B2 | 1/2017 | Fong et al. | |
| 9,864,377 B2 | 1/2018 | Welty et al. | |
| 9,910,444 B2 | 3/2018 | Eade et al. | |
| 9,952,053 B2 | 4/2018 | Fong et al. | |
| 10,093,021 B2 | 10/2018 | Aghamohammadi et al. | |
| 10,209,063 B2 | 2/2019 | Anderson-Sprecher | |
| 10,383,497 B2 | 8/2019 | Han et al. | |
| 10,667,664 B2 | 6/2020 | Sheikh et al. | |
| 11,927,965 B2 | 3/2024 | Ebrahimi Afrouzi et al. | |
| 2004/0117079 A1 | 6/2004 | Hulden | |
| 2006/0188168 A1 | 8/2006 | Sheraizin et al. | |
| 2008/0059015 A1 | 3/2008 | Whittaker et al. | |
| 2008/0294338 A1 | 11/2008 | Doh et al. | |
| 2009/0059270 A1 * | 3/2009 | Opalach | G06V 20/64 358/1.15 |
| 2012/0121161 A1 | 5/2012 | Eade et al. | |
| 2014/0344118 A1 * | 11/2014 | Parpia | G06Q 10/087 705/28 |
| 2015/0261223 A1 | 9/2015 | Fong et al. | |
| 2020/0104748 A1 * | 4/2020 | Zucker | G06F 16/58 |
| 2022/0188756 A1 * | 6/2022 | Morris | G06Q 10/06315 |

FOREIGN PATENT DOCUMENTS

| | | |
|---|---|---|
| JP | 3265212 B2 | 3/2002 |
| JP | 2009216600 A | 9/2009 |
| JP | 2009288930 A | 12/2009 |
| JP | 5769455 B2 | 8/2015 |
| KR | 10-2010-0027683 A | 3/2010 |
| KR | 101048098 B1 | 7/2011 |
| WO | 2011146259 A2 | 11/2011 |

OTHER PUBLICATIONS

Bernard Feverjon et al., A local based approach for path planning of manipulators with a high No. of degrees of freedom. Proceedings. 1987 IEEE International Conference on Robotics and Automation 4 (1987): 1152-1159.

Brett R. Fajen et al., A Dynamical Model of Visually-Guided Steering, Obstacle Avoidance, and Route Selection. International Journal of Computer Vision 54 (2003): 13-34.

Christoph Rosmann et al., Efficient Trajectory Optimization Using a Spares Model. 2013 Eur. Conf. on Mobile Robots; Sep. 2013.

Dave Ferguson et al., Planning Long Dynamically Feasible Maneuvers for Autonomous Vehicles, Int'l J. of Robotics Research, vol. 28(8); Jun. 26, 2009.

David G. Lowe, Object Recognition from Local Scale-Invariant Features; 1999.

Dieter Fox et al., The Dynamic Window Approach to Collision Avoidance, IEEE Robotics and Automation Magazine, vol. 4(1); Apr. 1997.

Francisco Amoros et al., Global Appearance Applied to Visual Map Building and Path Estimation Using Multiscale Analysis, Hindawi Publishing Corporation, Mathematical Problems in Engineering, vol. 2014 Article ID 365417; Jul. 22, 2014.

Gany Berkovic and Ehud Shafir, Optical Methods for Distance and Displacement Measurements; Sep. 11, 2012.

Handbook of Optical Systems, vol. 4: Survey of Optical Instruments; 2008.

Hani Safadi, Local Path Planning Using Virtual Potential Field, McGill University School of Computer Science; Apr. 18, 2007.

J.M. Rueger, Electronic Distance Measurement, 3rd Ed.; 1990.

J.M. Rueger, Electronic Distance Measurement, 4th Ed.; 1996.

Kazushi Nakazawa et al., Movement Control of Accompanying Robot Based on Artificial Potential Field Adapted to Dynamic Environments, Elec. Engin. in Japan, vol. 192; Feb. 2014.

Khalid Yousif et al., An Overview to Visual Odometry and Visual SLAM: Applications to Mobile Robotics, Intell. Ind. Syst. Vol. 1, 289; Nov. 13, 2015.

Laurent Itti, Christof Koch, and Ernst Niebur, A Model of Saliency-Based Visual Attention for Rapid Scene Analysis; Nov. 1998.

Lina J. Karam, Nabil G. Sadaka, Rony Ferzli, and Zoran A. Ivanovski, An Efficient Selective Perceptual-Based Super-Resolution Estimator; Dec. 2011.

Lu and Milios, Globally Consistent Range Scan Alignment for Environment Mapping, Autonomous robots, 4 Autonomous robots 333-49 (1997).

Lu Yin et al., A New Potential Field Method for Mobile Robot Path Planning in the Dynamic Environments, Asian J. of Conti ol vol. 11(2); Mar. 2009.

Matthias Nieuwenhuisen et al., Predictive Potential Field-Based Collision Avoidance for Multicopters, Remote Sensing and Spatial Information Sciences, vol. XL-1; Sep. 4, 2013.

Mejdl Safran and Steven Haar, Arduino and Android Powered Object Tracking Robot; Nov. 27, 2012.

Oscar Montiel et al., Optimal Path Planning Generation for Mobile Robots Using Parallel Evolutionary Artificial Potential Field, J. Intell. Robot Sys .; Sep. 20, 2014.

Oussama Khatib, Real-Time Obstacle Avoidance for Manipulators and Mobile Robots Int'l J. of Robotics Research, vol. 5(1); 1986.

P. Payeur, Improving Robot Path Planning Efficiency with Probabilistic Virtual Environment Models. IEEE Int'l Conf on Virtual Environments; Jul. 2004.

Peter Biber and Wolfgang StraBer, nScan-Matching: Simultaneous Matching of Multiple Scans and Application to SLAM, Proceedings 2006 IEEE International Conference on Robotics and Automation, 2006.

Pierre Melchior et al., Robust Path Planning for Mobile Robot Based on Fractional Attractive Force. 2009 American Control Conf .; Jun. 2009.

Qian Jia & Xingsong Wang, An Improved Potential Field Method for Path Planning, 2010 Chinese Control and Decision Conference; 2010.

Qian Xu, Chaitali Chakrabarti, and Lina J. Karam, A Distributed Canny Edge Detector and its Implementation on FGPA; 2011.

Richard Szeliski, Image Alignment and Stitching: A Tutorial, Foundations and Trends in Computer vol. 2; 2006.

Sean Quinlan & Oussama Khatib, Elastic Bands: Connecting Path Planning and Control, IEEE Int'l Conference on Robotics and Automation; 1998.

Srenivas Varadarajan and Lina J. Karam, An Improved Perception-Based No. Reference Objective Image Sharpness Metric Using Iterative Edge Refinement; 2008.

Srenivas Varadarajan, Chaitali Chakrabarti, Lina J. Karam, and Judit Maitinez Bauza, A Distributed Psycho-Visually Motivated Canny Edge Detector; 2010.

Srenivas Varadarajan, Lina J. Karam, and Dinei Florencio, Background Recovery from Video Sequences Using Motion Parameters; 2009.

(56) References Cited

OTHER PUBLICATIONS

Stachniss et al., Springer Handbook of Robotics, Chapter 46: Simultaneous Localization and Mapping, Springer (2d ed.); Jan. 1, 2016.
Prassler et al., Springer Handbook of Robotics, Chapter 65: Domestic Robots, Springer (2d ed.); Jan. 1, 2016.
Suzuki and Abe, Topological Structural Analysis of Digitized Binary Images by Border Following; 1983.
Wang Tianmiao et al., Mobile Robot Control Based on Dynamic Potential, Chinese J. of Sys. Engin. & Elec. Vol. 3; Mar. 31, 1992.
Ya-Chun Chang & Yoshio Yamamoto, Path Planning of Wheeled Mobile Robot with Simultaneous Free Space Locating Capability, Int'l Serv. Robotics; Nov. 25, 2008.
Yong K. Hwang & Narenda Ahuja, A Potential Field Approach to Path Planning, IEEE Transactions on Robotics and Automation vol. 8(1); Feb. 1992.
Wolfgang Hess et al., Real-time loop closure in 2D Lidar Slam, 2016 IEEE International Conference on Robotics and Automation; May 16-21, 2016.
Zhenyu Wu et al., Collision Avoidance for Mobile Robots Based on Artificial Potential Field and Obstacle Envelope Modelling, Assembly Automation, vol. 36(3); Aug. 1, 2016.
Kaiqi Huang, Liangsheng Wang, Tieniu Tan, and Steve Maybank, A Real-Time Object Detecting and Tracking System for Outdoor Night Surveillance; 2008.
Subramanian Saravankumar et al., Multipoint potential field method for path planning of autonomous underwater vehicles in 3D space, Intel Serv Robots 2013; Oct. 6, 2013.
Javier Minguez et al., Abstracting Vehicle Shape and Kinematic Constraints from Obstacle Avoidance Methods, Autonomous Robots, vol. 20(1); Feb. 3, 2006.
Alan Conrad Bovik, Marianna Clark, Wilson S. Geisler, Multichannel Texture Analysis Using Localized Spatial Filters; Jan. 1990.
John Canny, A Computational Approach to Edge Detection, IEEE Transactions on Pattern Analysis and Machine Intelligence, vol. PAMI- 8, No. 6; Nov. 1986.
Edwin B. Olson, Robust and Efficient Robotic Mapping, Massachusetts Institute of Technology; 2008.
Giorgio Grisetti, et al., Nonlinear Constraint Network Optimization for Efficient Map Learning, 10 IEEE Transactions on Intelligent Transportation Systems 428; Sep., 2009.
Edwin Olson, et al., Fast Iterative Alignment of Pose Graphs with Poor Initial Estimates, Proceedings of the 2006 IEE Conference on Robotics and Automation; May 2006.
John Folkesson and Henrik I. Christensen, Closing the Loop with Graphical SLAM 23 IEEE Transactions on Robotics 731; Aug., 2007.
Carlos Estrada, et al., Hierarchical SLAM: Real-Time Accurate Mapping of Large Environments, 21 IEEE Transactions on Robotics 588; Aug., 2005.
Tim Bailey and Hugh Durrant-Whyte, Simultaneous Localization and Mapping (SLAM): Part II, IEEE Robotics & Optimization Magazine; Sep. 2006.
Seongsoo Lee and Sukhan Lee, Embedded visual SLAM: Applications for low-cost consumer robots, 20 IEEE Robotics & Automation Magazine 83; 2013.
J.A. Castellanos, J. Montiel, J. Neira, J.D Tardos, The SPmap: A probabilistic framework for simultaneous localization and map building, 15(5) IEEE Trans. Robotics and Automation 948-952; 1999.
J. Scholz, S. Chitta, B. Marthi, M. Likhachev, Cart Pushing with a Mobile Manipulation System: Towards Navigation with Moveable Objects, IEEE International Conference on Robotics and Automation 6115-6120; 2011.
Neato XV-11.
Neato XV Signature Pro.
IRobot Roomba 880.
Karcher RoboCleaner RC3000.
The Dottie.
Orazio.
IRobot Scooba.
Kiva Systems (n/k/a Amazon Robotics).
Locus Robotics.
Google Self-Driving Car Project (n/k/a Waymo).
BMW M235i.
Avidbots ARS-2.
Avidbots Neo.
Internet Archives, WayBackMachine; http://www.neatorobotics.com/buy.html; Catured date: Jan. 23, 2010.
How Waterloo became a world-class robotics hub—The Globe and Mail; https://www.theglobeandmail.com/report-on-business/rob-magazine/how-waterloo-became-a-world-class-robotics-hub/article29784283/; Accessed Mar. 15, 2025.
News Release, iRobot Enters the Smart Home with Roomba® 980 Vacuum Cleaning Robot, Date: Sep. 16, 2015.
News Release, iRobot Expands Connected Product Line with Roomba@ 960; Date: Aug. 4, 2016.
E. Eade, P. Fong and M. E. Munich, "Monocular graph SLAM with complexity reduction," 2010 IEEE/RSJ International Conference on Intelligent Robots and Systems, Taipei, Taiwan, 2010, pp. 3017-3024.
Internet Archives, WayBackMachine; http://www.neatorobotics.com/faq.html; captured Jan. 24, 2010.
Neato XV-11 Robotic All-Floor Vacuum System; 2009.
Neato XV-11™ Vacuum User's Guide; Jan. 30, 2010.
Chang, Ya-Chun and Yoshio Yamamoto. "On-line path planning strategy integrated with collision and dead-lock avoidance schemes for wheeled mobile robot in indoor environments." Ind. Robot 35 (2008): 421-434.
Internet Archives, WayBackMachine; http://www.robotreviews.com/reviews/review-of-the-neato-xv-11-the-roomba-killer; Catured date: Sep. 23, 2010.

* cited by examiner

| Category | OCR | IOD | SKU | GTIN | Description | Price (OCR) | Location |
|---|---|---|---|---|---|---|---|
| Pallet | Joe's Black Tea 18pk 16.9oz | Joe's Black Tea 18pk 16.9oz | 219422 | 5810389392123 | 18pk 16.9oz; Joe's brand | $5.49 | RESERVE STORAGE 1 |
| Pallet | Creature Energy Drink; 6pk 8oz | Creature Energy Drink; 6pk 8oz | 234839 | 3810289493218 | 6pk 8oz; Creature Brand | $0.21 | GROCERY 3 |
| Pallet | Blue Ox Energy Drink; 12pk 12 oz | Blue Ox Energy Drink; 12pk 12 oz | 848418 | 2931742928944 | 12 pk 12 oz; Blue Ox Brand | $9.99 | |
| Shelf | Admiral Crunch Flakes; 25 oz | Fruit Squares; 25 oz | 285710 | 2847108262342 | 25 oz single box; Fruit Squares cereal | $5.49 | GROCERY 5 |
| ... | | | | | | | |

FIG. 6

SYSTEMS AND METHODS FOR IDENTIFYING EXCEPTIONS IN FEATURE DETECTION ANALYTICS

CROSS-REFERENCE TO RELATED APPLICATIONS

This application claims the benefit of U.S. Provisional Application No. 63/435,653, filed Dec. 28, 2022, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for identifying exceptions in feature detection analytics.

SUMMARY

The foregoing needs are satisfied by the present disclosure, which provides for, inter alia, systems and methods identifying exceptions in feature detection analytics.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally be referred to autonomous vehicle or object that travels a route, executes a task, or otherwise moves automatically upon executing or processing computer readable instructions.

According to at least one non-limiting exemplary embodiment, a system configured to identify exceptions in product displays is disclosed. The system comprises a robot comprising at least one sensor configured to take images of objects as the robot travels in an environment, each image acquired by the robot is localized by a controller thereon; at least one user device; and a server in communication with the robot and at least one user device, the server comprises at least one processor configured to execute computer readable instructions to: receive the images of objects and associated localization data for the images from the robot, the images depict at least one feature to be identified; generate a first data set comprising image object detection predictions for each of the at least one features to be identified within the image; generate a second data set comprising optical character recognition predictions for each of the at least one features to be identified within the image; receive a third data set corresponding to a catalog, the catalog indicates an expected arrangement, location, and price of features within the environment; identify at least one exception based on a discrepancy between either the first data set and the second data set for each of the at least one features to be identified, or a discrepancy between the first and second data sets with the catalog; generate a report comprising a list of identified features and the at least one exception; and communicate the report to a user device.

According to at least one non-limiting exemplary embodiment, the non-transitory memory comprises computer readable instructions that further configure the at least one processor of the server to: identify exclusions if at least one of the following fields corresponding to each of the at least one features are missing or invalid: (i) site location; (ii) robot location; (iii) annotation information associated with the object being scanned; (iv) bin information; (v) UPC, SKU, or GTIN values; or (vi) description of the item.

According to at least one non-limiting exemplary embodiment, the non-transitory memory comprises computer readable instructions that further configure the at least one processor of the server to: receive annotations to a computer readable map of an environment of the robot, the annotations define on the computer readable map a plurality of areas encompassed by objects to be scanned for features, wherein each area includes at least one face on its perimeter, each face is assigned a face identifier ("ID") value; receive face configurations for each face ID of each of the objects to be scanned, wherein the configurations denote semantic information, functional information, and exception information associated with the face ID; wherein the annotations are received via a user interface coupled to the device, server, or robot.

According to at least one non-limiting exemplary embodiment, the exception information contains a reserve storage field; and an exception is generated for an identified feature if the feature is a reserve storage item which is detected where the exception information indicates reserve storage should not be present, or vice versa.

According to at least one non-limiting exemplary embodiment, the exception information contains a department information field; and the at least one processor of the server produces an exception for a detected feature if the detected feature cannot be stored or displayed in the department, the departments in which certain features can or cannot be present are denoted by a catalog provided to the server.

According to at least one non-limiting exemplary embodiment, the non-transitory memory comprises computer readable instructions that further configure the at least one processor of the server to provide at least one image captured by the robot to the device upon the device requesting to view one or more noted exceptions in more detail via a user interface of the device.

According to at least one non-limiting exemplary embodiment, the non-transitory memory comprises computer readable instructions that further configure the at least one processor of the server to compare a location of the at least one feature to a reference planogram, the reference planogram being retrieved based in part on the location of the robot during acquisition of the images; and generate an exception for any of the at least one features which comprise locations different from their denoted location in the reference planogram.

Another aspect provides a method for identifying exceptions in product displays, comprising: a server comprising at least one processor configured to execute computer readable instructions, the at least one processor: receiving an image of objects and associated localization data for the image from a robot comprising at least one sensor configured to take images of objects as the robot travels in an environment and a controller configured to localize the image as it is taken, wherein the image depicts at least one feature to be identified; generating a first data set comprising image object detection predictions for each of the at least one features to be identified within the image; generating a second data set comprising optical character recognition predictions for each of the at least one features to be identified within the image; receiving a third data set corresponding to a catalog, the catalog indicates an expected arrangement, location, and price of features within the environment; identifying at least one exception based on a discrepancy between either the first data set and the second data set for each of the at least one features to be identified, or a discrepancy between the first and second data sets with the catalog; generating a report comprising a list of identified features and the at least one exception; and communicating the report to a user device.

According to a non-limiting embodiment, the method comprises the at least one processor identifying exclusions if at least one of the following fields corresponding to each of the at least one features is missing or invalid: (i) site location; (ii) robot location; (iii) annotation information associated with the object being scanned; (iv) bin information; (v) UPC, SKU, or GTIN values; or (vi) description of the item.

According to a non-limiting embodiment, the method comprises the at least one processor receiving annotations to a computer readable map of an environment of the robot, the annotations defining on the computer readable map areas encompassed by objects to be scanned for features, each area includes at least one face on its perimeter, and each face is assigned a face identifier ("ID") value; receiving face configurations for each face ID of each of the objects to be scanned, the configurations denoting semantic information, functional information, and exception information associated with the face ID; wherein the annotations are received via a user interface coupled to the device, server, or robot.

According to a non-limiting embodiment, the exception information contains a reserve storage field; and the method comprises generating an exception for an identified feature if the feature is a reserve storage item which is detected where the exception information indicates reserve storage should not be present, or vice versa.

According to a non-limiting embodiment, the exception information includes a department information field; and the method comprises producing an exception for a detected feature if the detected feature cannot be stored or displayed in the department, the departments in which certain features can or cannot be present are denoted by a catalog provided to the server.

According to a non-limiting embodiment, the method further comprises the at least one processor of the server providing at least one image captured by the robot to the device upon the device requesting to view one or more noted exceptions in more detail via a user interface of the device.

According to a non-limiting embodiment, the method further comprises comparing a location of the at least one feature to a reference planogram, the reference planogram being retrieved based in part on the location of the robot during acquisition of the images; and generating an exception for any of the at least one features comprise locations different from their denoted location in the reference planogram.

Another aspect provides a non-transitory computer readable storage medium having a plurality of instructions stored thereon which, when executed by at least one processor in communication with a robot, configure the at least one processor to identify exceptions in product displays, wherein the at least one processor is configured to receive at least one image from the robot, wherein the robot comprises at least one sensor configured to take images of objects as the robot travels in an environment, wherein each image acquired by the robot is localized by a controller thereon and each image depicts at least one feature to be identified and includes associated localization data; generate a first data set comprising image object detection predictions for each of the at least one features to be identified within the image; generate a second data set comprising optical character recognition predictions for each of the at least one features to be identified within the image; receive a third data set corresponding to a catalog, the catalog indicates an expected arrangement, location, and price of features within the environment; identify at least one exception based on a discrepancy between either the first data set and the second data set for each of the at least one features to be identified, or a discrepancy between the first and second data sets with the catalog; generate a report comprising a list of identified features and the at least one exception; and communicate the report to a user device.

According to a non-limiting embodiment, the at least one processor of the server is further configured to execute the computer readable instructions to identify exclusions if at least one of the following fields corresponding to each of the at least one features is missing or invalid: (i) site location; (ii) robot location; (iii) annotation information associated with the object being scanned; (iv) bin information; (v) UPC, SKU, or GTIN values; or (vi) description of the item.

According to a non-limiting embodiment, the at least one processor of the server is further configured to execute the computer readable instructions to receive annotations to a computer readable map of an environment of the robot, the annotations define on the computer readable map areas encompassed by objects to be scanned for features, each area includes at least one face on its perimeter, each face is assigned a face identifier ("ID") value; receive face configurations for each face ID of each of the objects to be scanned, wherein the configurations denote semantic information, functional information, and exception information associated with the face ID; wherein the annotations are received via a user interface in communication with the device, server, or robot.

According to a non-limiting embodiment, the exception information contains a reserve storage field; and an exception is generated for an identified feature if the feature is a reserve storage item which is detected where the exception information indicates reserve storage should not be present, or vice versa.

According to a non-limiting embodiment, the exception information includes a department information field; and the at least one processor of the server produces an exception for a detected feature if the detected feature cannot be stored or displayed in the department, the departments in which certain features can or cannot be present are denoted by a catalog provided to the server.

According to a non-limiting embodiment, the at least one processor of the server is further configured to execute the computer readable instructions to provide at least one image captured by the robot to the device upon the device requesting to view one or more noted exceptions in more detail via a user interface of the device.

According to a non-limiting embodiment, the at least one processor of the server is further configured to execute the computer readable instructions to compare a location of the at least one feature to a reference planogram, the reference planogram being retrieved based in part on the location of the robot during acquisition of the images; and generate an exception for any of the at least one features comprise locations different from their denoted location in the reference planogram.

According to at least one non-limiting exemplary embodiment, the non-transitory memory comprises computer readable instructions that further configure the at least one processor of the server to: receive a first feedback signal from the device, the feedback signal indicates one or more exceptions of the at least one exception is valid or invalid; remove the one or more exceptions which are invalid from the report; receive a second feedback signal from the device, the second feedback signal indicates if the one or more valid exceptions has been resolved; and remove the valid exceptions which have been resolved from the report.

According to at least one non-limiting exemplary embodiment, the identified exceptions are based on exception criteria provided to the at least one processor, the exception criteria including a list of exceptions to include in the report.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 6 is an aggregated analytics table including noted exception cases, according to an exemplary embodiment.

Figure 1A:
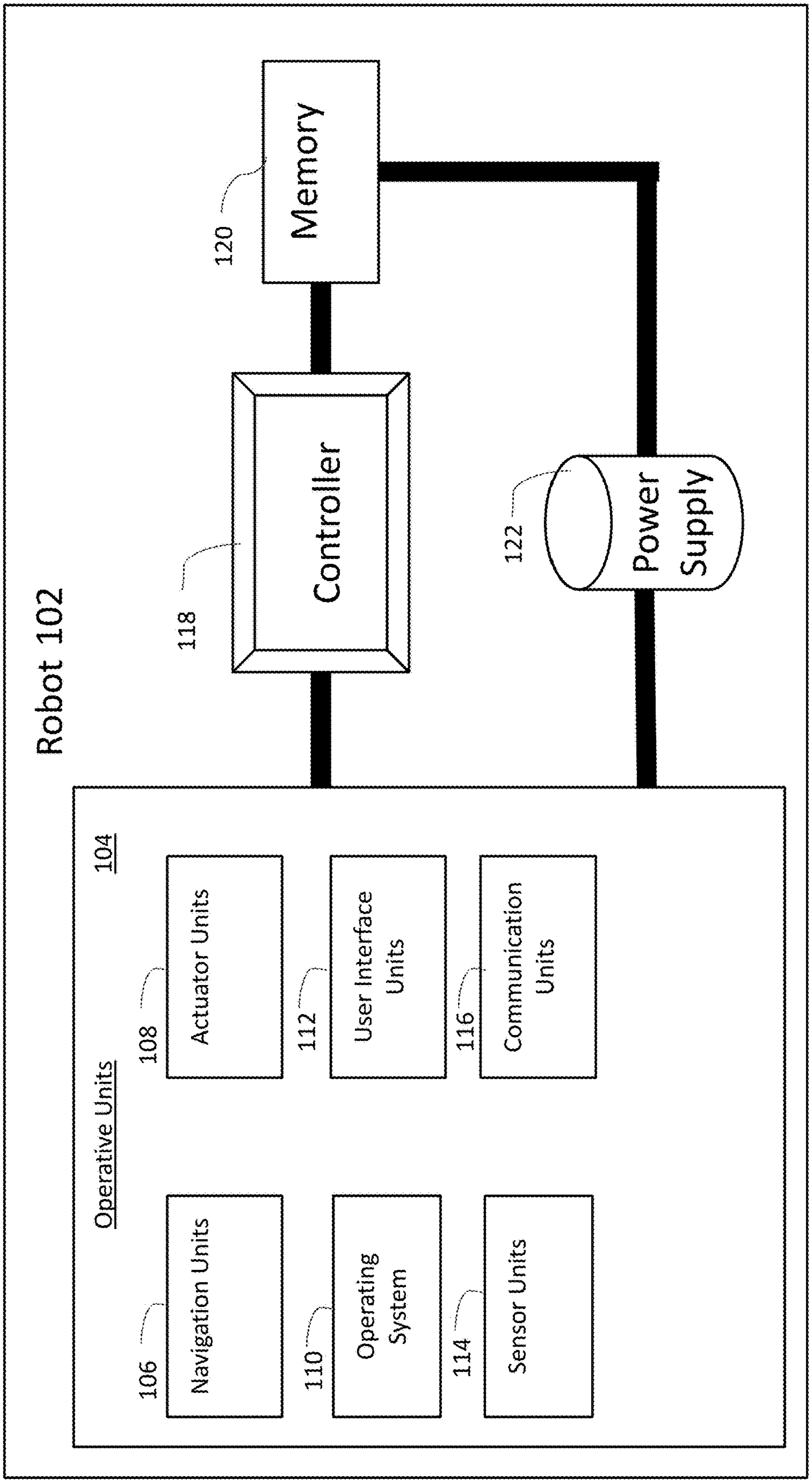
FIG. 1A is a functional block diagram of a robot in accordance with some embodiments of this disclosure.

All Figures disclosed herein are © Copyright 2023 Brain Corporation. All rights reserved.

DETAILED DESCRIPTION

Currently, many retail or warehouse environments may contain hundreds if not thousands of individual items. These items should, preferably, be arranged in accordance with planogram instructions and price tag compliance. Often it can be challenging for humans to remember precise planogram arrangements and prices for these thousands of items, making it difficult for these humans to even identify when a product is misplaced or mispriced by simple visual inspection. Various private analyses have indicated that planogram and price tag non-compliance can cost millions of dollars for large retail chains (e.g., "Optimizing In-Store Merchandising" by Joe Skorupa of Retail Info Systems published in 2013) due to sub-optimal sales display arrangements and price confusion. This presents a large gap between what humans are reasonably capable of doing and what is optimal for sales. Specifically, without planogram diagrams provided or a list of prices for all items, a human may struggle to identify misplaced or mispriced items, and even with such lists it may take hours to verify all items in a store. Robots, unlike humans, can record their locations to centimeter precision, are able to store and recall photo-exact images of visual scenes, and such information may be leveraged to identify misplaced/mispriced items automatically, as described herein. Accordingly, there is a need in the art to leverage robotics to bridge this gap between human abilities and optimal configurations of product displays to reduce the number of lost sales and improve inventory turnover while streamlining human workflows.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented, or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for identifying exceptions in feature detection analytics. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards. SEGWAY™ vehicles, etc.), trailer movers, vehicles, and the like. Robots may also include any autonomous and/or semi-autonomous machine for transporting items, people, animals, cargo, freight, objects, luggage, and/or anything desirable from one location to another.

As used herein, an exception in a feature detection analytics report or output corresponds to a detection of a feature which prompts a corrective action. In other words, an exception corresponds to detection of an issue or problem to be fixed, either by a robot 102 or human. For instance, when detecting objects in a retail store, most items may tend to be detected in their expected location and listed with an expected price. A feature scanning report may comprise, e.g., a list of all the items detected, their detected prices, and their detected location. An exception in the report may correspond to a detection of an item in an unexpected location and/or listed with an unexpected/incorrect price, wherein a corrective action is needed to adjust the incorrect price or location. Other exemplary exception criteria are discussed in greater detail below.

As used herein, a shelf-keeping unit ("SKU") corresponds to an (alpha)numeric identifier which corresponds to a product. Shelf keeping unit identifiers are unique to a particular location, such as a store. For instance, a SKU of "324840" may correspond to watermelons in one grocery store but may correspond to another item in other stores.

As used herein, a global trade identification number ("GTIN") or universal product code ("UPC") corresponds to an (alpha)numeric identifier which corresponds to a product used across multiple stores, environments, and entities. For instance, and unlike a SKU, a GTIN of "3949781848" should always correspond to watermelons regardless of the vendor of such watermelons, GTIN and UPC comprise standardized lengths and characters determined by an independent standard-setting organization, SKU, GTIN, and UPC are used herein to describe inventory identifiers, both locally in a single environment and globally across many environments, wherein it is appreciated that other standardized encoding of inventory items may be utilized.

As used herein, a planogram refers to an ideal, reference arrangement of a shelf, display, or other configuration of products for sale or for storage. Planograms typically comprise arrangements of products based on market research that yield the most optimal turnover, wherein failing to comply with a planogram may generate sub-optimal sales.

As used herein, network interfaces may include any signal, data, or software interface with a component, network, or process including, without limitation, those of the Fire Wire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc, variants thereof), IrDA families, etc. As used herein. Wi-Fi may include one or more of IEEE-Std. 802.11, variants of IEEE-Std, 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps that perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) improve the rate at which misplaced/mispriced items are identified; (ii) improve the speed at which an individual misplaced/mispriced item is detected; (iii) free humans from performing this task which is often arduous to perform other tasks; or (iv) provide quality assured feature identifications to consumers that fit their use cases and environments. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadratic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on-board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. In another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118)

may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously, or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find its position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; repose cameras and sensors; etc. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for shoppers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 112 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®. ZIGBEE. Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A. LTE-U. LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables. Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
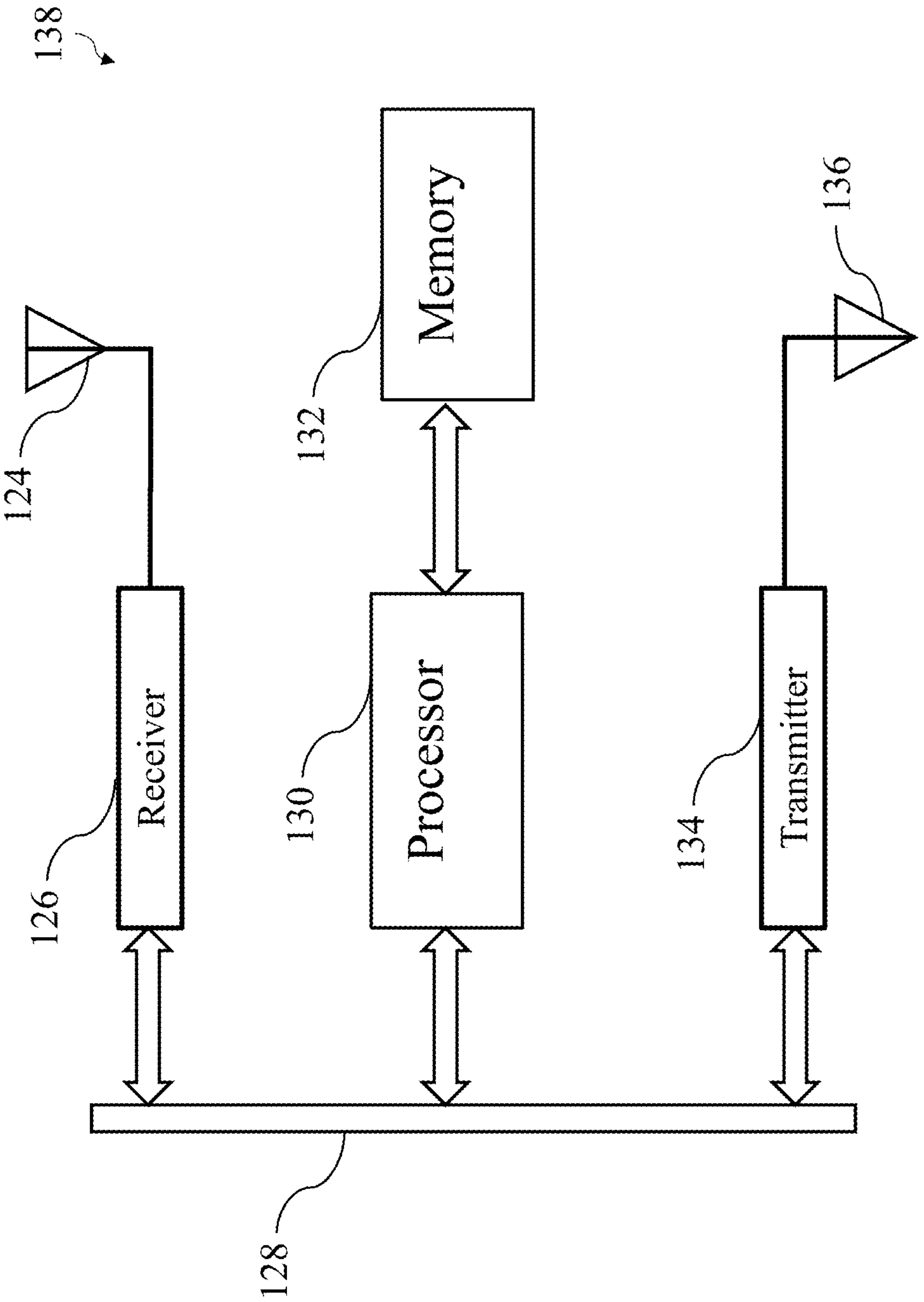
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components-receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive. MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location, such as server 202 illustrated next in FIG. 2A. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS. DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

Figure 2A:
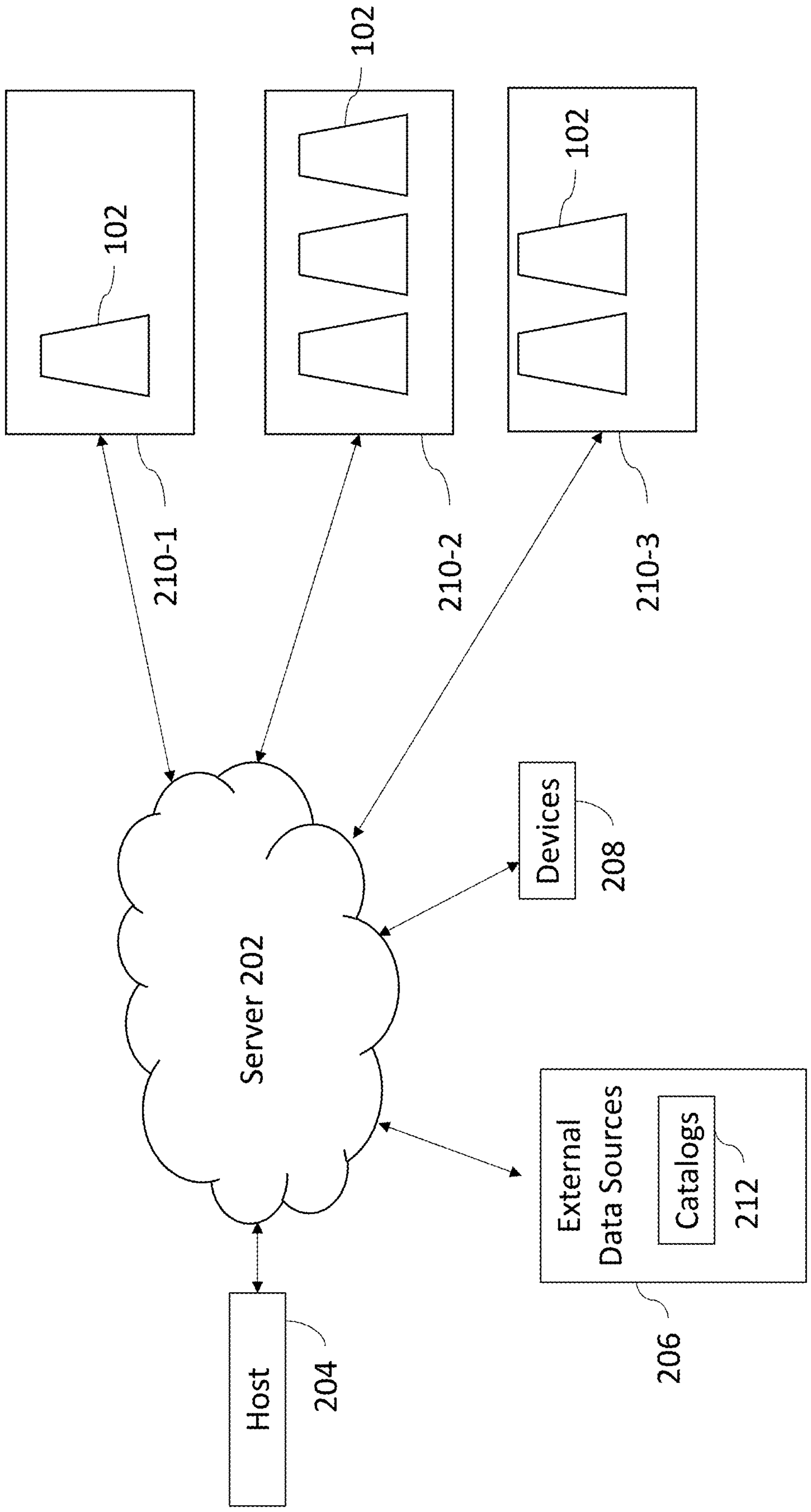
FIG. 2A is a functional block diagram of a server system coupled to a plurality of robots and devices in accordance with some embodiments of this disclosure.

FIG. 2A illustrates a server 202 and communicatively coupled components thereof in accordance with some exemplary embodiments of this disclosure. The server 202 may comprise one or more processing units depicted in FIG. 1B above, each processing unit comprising at least one processor 130 and memory 132 therein in addition to, without limitation, any other components illustrated in FIG. 1B. The processing units may be centralized at a location or distributed among a plurality of devices (e.g., a cloud server or dedicated server). Communication links between the server 202 and coupled devices may comprise wireless and/or wired communications, wherein the server 202 may further comprise one or more coupled antennae to effectuate the wireless communication. The server 202 may be coupled to a host 204, wherein the host 204 may correspond to a high-level entity (e.g., an admin) of the server 202. The host 204 may, for example, upload software and/or firmware updates for the server 202 and/or coupled devices 208 and 210, connect or disconnect devices 208 and 210 to the server 202, or otherwise control operations of the server 202. External data sources 206 may comprise any publicly available data sources (e.g., public databases such as weather data from the national oceanic and atmospheric administration (NOAA), satellite topology data, public records, etc.) and/or any other databases (e.g., private databases with paid or restricted access) of which the server 202 may access data therein. Devices 208 may comprise any device configured to perform a task at an edge of the server 202. These devices may include, without limitation, internet of things (IoT) devices (e.g., stationary CCTV cameras, smart locks, smart thermostats, etc.), external processors (e.g., external CPUs or GPUs), and/or external memories configured to receive and execute a sequence of computer readable instructions, which may be provided at least in part by the server 202, and/or store large amounts of data.

External data sources may further include a catalog 212. Catalogs, as used herein, comprise digital or computer readable lists of products, items, or features of an environment. The catalogs may be organized as tables, spreadsheets, etc. Catalogs may typically include product names, SKU/GTIN identifiers, descriptions, images of the items, prices, as well as any sales or promotion information, if applicable. Catalogs are used extensively in retail and warehouse environments as methods of inventory tracking and maintaining uniformity across multiple physical stores. The catalogs 212 accessed by the server 202 correspond to an environment of one or more robots 102 of a robot network 210. Typically catalogs 212 are maintained and updated by owners or managers of the environment, such as a retail store manager or higher-level executives, to meet inventory and/or sales needs. Catalogs 212 herein will serve as a reference for what items/features can be present within an environment as well as denote their ideal prices. In some embodiments, catalogs 212 may further define other features, such as operational exceptions described below. For instance, a catalog 212 may indicate a list of items to be kept in a freezer, wherein detecting those items outside the freezer should immediately prompt action to avoid the product spoiling. It is appreciated that the catalog 212 is not free from errors and does not serve as a ground truth. For instance, if a detected price label includes a price different from the catalog 212, this is denoted herein as a 'price tag mismatch' as opposed to 'incorrect price' because the possibility that the catalog 212 contains a price error is nonzero. For example, a store manager may determine a sale price for an item that is not updated in the catalog, leading to a price tag mismatch.

Lastly, the server 202 may be coupled to a plurality of robot networks 210, each robot network 210 comprising a local network of at least one robot 102. Each separate network 210 may comprise one or more robots 102 operating within separate environments from each other. An environment may comprise, for example, a section of a building (e.g., a floor or room) or any space in which the robots 102 operate. Each robot network 210 may comprise a different number of robots 102 and/or may comprise different types of robot 102. For example, network 210-2 may comprise a scrubber robot 102, vacuum robot 102, and a gripper arm robot 102, whereas network 210-1 may only comprise a robotic wheelchair, wherein network 210-2 may operate within a retail store while network 210-1 may operate in a home of an owner of the robotic wheelchair or a hospital. Network 210-3 may comprise a plurality of robots 102 of the same type or made by the same manufacturer that are operating in separate physical environments, wherein communications from server 202 provide information to all robots within network 210-3. Each robot network 210 may communicate data including, but not limited to, sensor data (e.g., RGB images captured. LiDAR scan points, network signal strength data from sensors 202, etc.), IMU data, navigation and route data (e.g., which routes were navigated), localization data of objects within each respective environment, and metadata associated with the sensor. IMU, navigation, and localization data. Each robot 102 within each network 210 may receive communication from the server 202 including, but not limited to, a command to navigate to a specified area, a command to perform a specified task, a request to collect a specified set of data, a sequence of computer readable instructions to be executed on respective controllers 118 of the robots 102, software updates, and/or firmware updates. One skilled in the art may appreciate that a server 202 may be further coupled to additional relays and/or routers to effectuate communication between the host 204, external data sources 206, edge devices 208, and robot networks 210 which have been omitted for clarity. It is further appreciated that a server 202 may not exist as a single hardware entity, rather may be illustrative of a distributed network of non-transitory memories and processors.

According to at least one non-limiting exemplary embodiment, each robot network 210 may comprise additional processing units as depicted in FIG. 1B above and act as a relay between individual robots 102 within each robot network 210 and the server 202. For example, each robot network 210 may represent a plurality of robots 102 coupled to a single Wi-Fi signal, wherein the robot network 210 may comprise in part a router or relay configurable to communicate data to and from the individual robots 102 and server 202. That is, each individual robot 102 is not limited to being directly coupled to the server 202 and devices 206, 208.

One skilled in the art may appreciate that any determination or calculation described herein may comprise one or more processors of the server 202, edge devices 208, and/or robots 102 of networks 210 performing the determination or calculation by executing computer readable instructions. The instructions may be executed by a processor of the server 202 and/or may be communicated to robot networks 210 and/or edge devices 208 for execution on their respective controllers/processors in part or in entirety (e.g., a robot 102 may calculate a coverage map using measurements 308 collected by itself or another robot 102). Advantageously, use of a centralized server 202 may enhance a speed at which parameters may be measured, analyzed, and/or calculated by executing the calculations (i.e., computer readable instructions) on a distributed network of processors on robots 102 and devices 208. Use of a distributed network of controllers 118 of robots 102 may further enhance functionality of the robots 102 as the robots 102 may execute instructions on their respective controllers 118 during times when the robots 102 are not in use by operators of the robots 102.

Figure 2B:
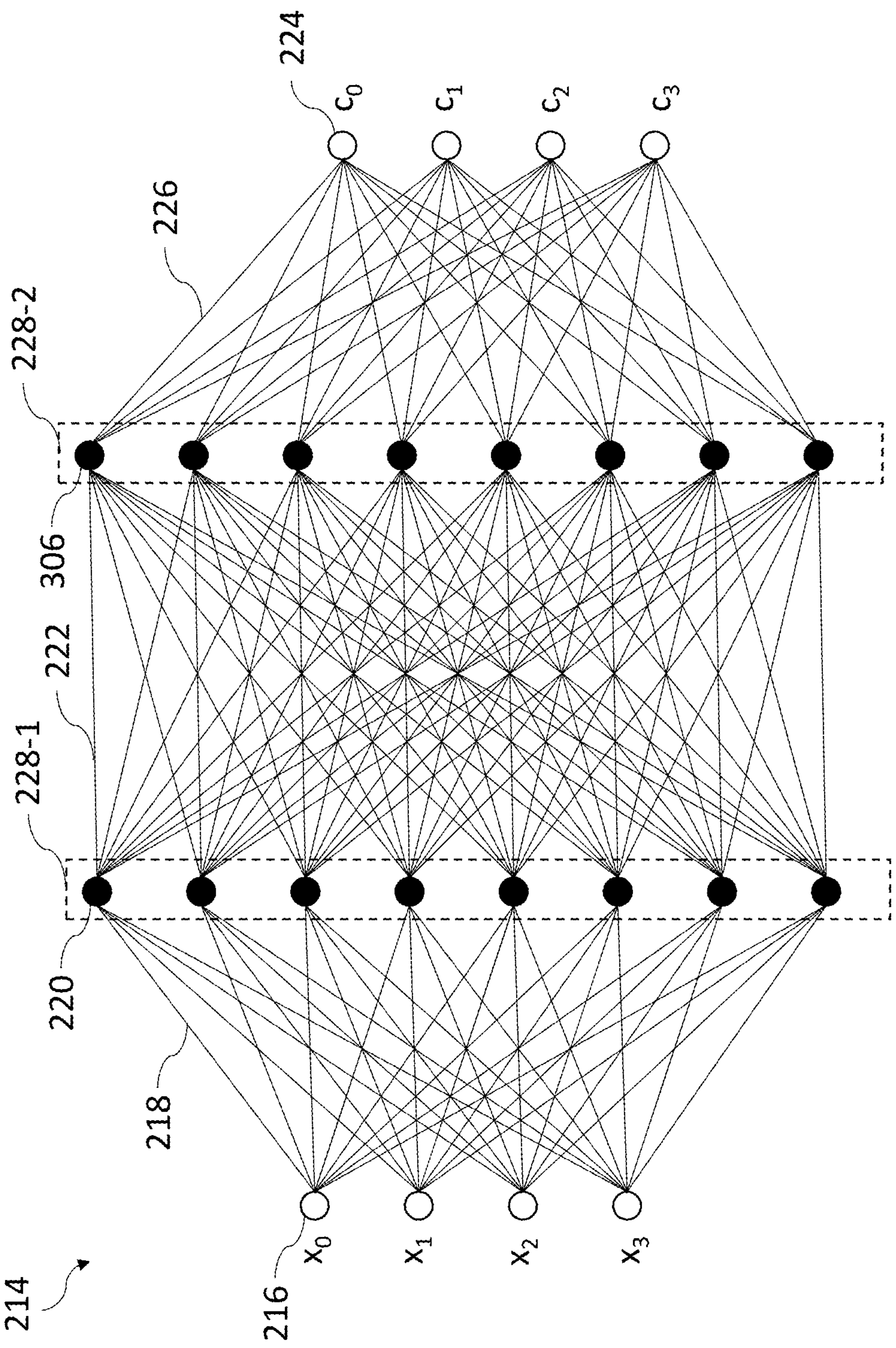
FIG. 2B is a (convolutional) neural network configured to receive an input to generate an output in accordance with prior training, according to an exemplary embodiment.

FIG. 2B illustrates a neural network 214, according to an exemplary embodiment. The neural network 214 may comprise a plurality of input nodes 216, intermediate nodes 220, and output nodes 224, the input nodes 216 being connected via links 218 to one or more intermediate nodes 220. Some intermediate nodes 220 may be respectively connected via links 222 to one or more adjacent intermediate nodes 220. Some intermediate nodes 220 may be connected via links 226 to output nodes 224. Links 218, 222, 226 illustrate inputs/outputs to/from the nodes 216, 220, and 224 in accordance with equation 1 below. The intermediate nodes 220 may form an intermediate layer 228 of the neural network 214. In some embodiments, a neural network 214 may comprise a plurality of intermediate layers 228, intermediate nodes 220 of each intermediate layer 228 being linked to one or more intermediate nodes 220 of adjacent layers, unless an adjacent layer is an input layer (i.e., input nodes 216) or an output layer (i.e., output nodes 224). The two intermediate layers 228 illustrated may correspond to a hidden layer of neural network 214, however a hidden layer may comprise more or fewer intermediate layers 228 or intermediate nodes 220. Each node 216, 220, and 224 may be linked to any number of nodes, wherein linking all nodes together as illustrated is not intended to be limiting. For example, the input nodes 216 may be directly linked to one or more output nodes 224.

The input nodes 220 may receive a numeric value $x_i$ of a sensory input of a feature, i being an integer index. For example, $x_i$ may represent color values of an $i^{th}$ pixel of a color image. The input nodes 220 may output the numeric value $x_i$ to one or more intermediate nodes 220 via links 218. Each intermediate node 220 may be configured to receive a numeric value on its respective input link 218 and output another numeric value $k_{i,j}$ to links 222 following the equation 1 below:

$$k_{i,j} = a_{i,j}x_0 + b_{i,j}x_1 + c_{i,j}x_2 + d_{i,j}x_3 \qquad \text{(Eqn. 1)}$$

Index i corresponds to a node number within a layer (e.g., $x_1$ denotes the first input node 216 of the input layer, indexing from zero). Index j corresponds to a layer, wherein j would be equal to one for the one intermediate layer 228-1 of the neural network 214 illustrated, however, j may be any number corresponding to a neural network 214 comprising any number of intermediate layers 228. Constants a, b, c, and d represent weights to be learned in accordance with a training process. The number of constants of equation 1 may depend on a number of input links 218 to a respective intermediate node 220. In this embodiment, all intermediate nodes 220 are linked to all input nodes 216, however this is not intended to be limiting. Intermediate nodes 220 of the second (rightmost) intermediate layer 228-2 may output values $k_{i,2}$ to respective links 226 following equation 1 above. It is appreciated that constants a, b, c, d may be of different values for each intermediate node 220. Further, although the above equation 1 utilizes addition of inputs multiplied by respective learned coefficients, other operations are applicable, such as convolution operations, thresholds for input values for producing an output, and/or biases, wherein the above equation is intended to be illustrative and non-limiting.

Output nodes 224 may be configured to receive at least one numeric value $k_{i,j}$ from at least an $i^{th}$ intermediate node 220 of a final (i.e., rightmost) intermediate layer 228. As illustrated, for example, each output node 224 receives numeric values $k_{0\text{-}7,2}$ from the eight intermediate nodes 220 of the second intermediate layer 228-2. The output of the output nodes 224 may comprise a classification of a feature of the input nodes 216. The output $c_i$ of the output nodes 224 may be calculated following a substantially similar equation as equation 1 above (i.e., based on learned weights and inputs from connections 226). Following the above example where inputs $x_i$ comprise pixel color values of an RGB image, the output nodes 224 may output a classification $c_i$ of each input pixel (e.g., pixel i is a car, train, dog, person, background, soap, or any other classification). Other outputs of the output nodes 224 are considered, such as, for example, output nodes 224 predicting a temperature within an environment at a future time based on temperature measurements provided to input nodes 216 at prior times and/or at different locations.

The training process comprises providing the neural network 214 with both input and output pairs of values to the input nodes 216 and output nodes 224, respectively, such that weights of the intermediate nodes 220 may be determined. An input and output pair comprise a ground truth data input comprising values for the input nodes 216 and corresponding correct values for the output nodes 224 (e.g., an image and corresponding annotations or labels). The determined weights configure the neural network 214 to receive input to input nodes 216 and determine a correct output at the output nodes 224. By way of illustrative example, annotated (i.e., labeled) images may be utilized to train a neural network 214 to identify objects or features within the image based on the annotations and the image itself, the annotations may comprise, e.g., pixels encoded with "cat" or "not cat" information if the training is intended to configure the neural network 214 to identify cats within an image. The unannotated images of the training pairs (i.e., pixel RGB color values) may be provided to input nodes 216 and the annotations of the image (i.e., classifications for each pixel) may be provided to the output nodes 224, wherein weights of the intermediate nodes 220 may be adjusted such that the neural network 214 generates the annotations of the image based on the provided pixel color values to the input nodes 216. This process may be repeated using a substantial number of labeled images (e.g., hundreds or more) such that ideal weights of each intermediate node 220 may be determined. The training process may be complete when predictions made by the neural network 214 falls below a threshold error rate which may be defined using a cost function.

As used herein, a training pair may comprise any set of information provided to input and output of the neural network 214 for use in training the neural network 214. For example, a training pair may comprise an image and one or more labels of the image (e.g., an image depicting a cat and a bounding box associated with a region occupied by the cat within the image).

Neural network 214 may be configured to receive any set of numeric values representative of any feature and provide an output set of numeric values representative of the feature. For example, the inputs may comprise color values of a color image and outputs may comprise classifications for each pixel of the image. As another example, inputs may comprise numeric values for a time dependent trend of a parameter (e.g., temperature fluctuations within a building measured by a sensor) and output nodes 224 may provide a predicted value for the parameter at a future time based on the observed trends, wherein the trends may be utilized to train the neural network 214. Training of the neural network 214 may comprise providing the neural network 214 with a sufficiently large number of training input/output pairs comprising ground truth (i.e., highly accurate) training data. As a third example, audio information may be provided to input nodes 216 and a meaning of the audio information may be provided to output nodes 224 to train the neural network 214 to identify words and speech patterns.

Generation of a sufficiently large number of input/output training pairs may be difficult and/or costly to produce. Accordingly, most contemporary neural networks 214 are configured to perform a certain task (e.g., classify a certain type of object within an image) based on training pairs provided, wherein the neural networks 214 may fail at other tasks due to a lack of sufficient training data and other computational factors (e.g., processing power). For example, a neural network 214 may be trained to identify cereal boxes within images, however the same neural network 214 may fail to identify soap bars within the images.

As used herein, a model may comprise the weights of intermediate nodes 220 and output nodes 224 learned during a training process. The model may be analogous to a neural network 214 with fixed weights (e.g., constants a, b, c, d of equation 1), wherein the values of the fixed weights are learned during the training process. A trained model, as used herein, may include any mathematical model derived based on a training of a neural network 214. One skilled in the art may appreciate that utilizing a model from a trained neural network 214 to perform a function (e.g., identify a feature within sensor data from a robot 102) utilizes significantly less computational recourses than training of the neural network 214 as the values of the weights are fixed. This is analogous to using a predetermined equation to solve a problem as compared to determining the equation itself based on a set of inputs and results.

According to at least one non-limiting exemplary embodiment, one or more outputs $k_{i,j}$ from intermediate nodes 220 of a $j^{th}$ intermediate layer 226 may be utilized as inputs to one or more intermediate nodes 220 an $m^{th}$ intermediate layer 226, wherein index m may be greater than or less than j (e.g., a recurrent or feed forward neural network). According to at least one non-limiting exemplary embodiment, a neural network 214 may comprise N dimensions for an N dimensional feature (e.g., a 3-dimensional input image or point cloud), wherein only one dimension has been illustrated for clarity. One skilled in the art may appreciate a plurality of other embodiments of a neural network 214, wherein the neural network 214 illustrated represents a simplified embodiment of a neural network to illustrate the structure, utility, and training of neural networks and is not intended to be limiting. The exact configuration of the neural network used may depend on (i) processing resources available. (ii) training data available. (iii) quality of the training data, and/or (iv) difficulty or complexity of the classification/problem. Further, programs such as AutoKeras utilize automatic machine learning ("AutoML") to enable one of ordinary skill in the art to optimize a neural network 214 design to a specified task or data set.

Figure 3:
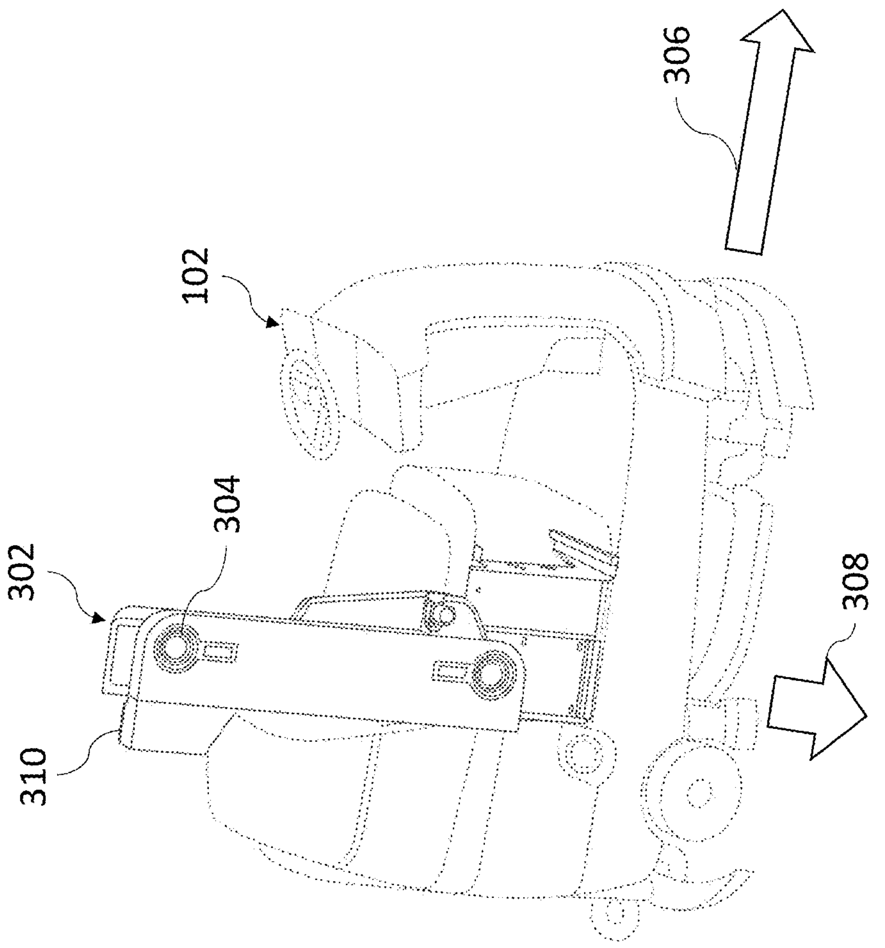
FIG. 3 illustrates a robot configured to scan for features in its environment, according to an exemplary embodiment.

FIG. 3 illustrates a robot 102 configured to scan for features within an environment, according to an exemplary embodiment. The robot 102, outlined in dashed lines, in this embodiment is a floor cleaning robot 102 configured to scrub/clean floors as it navigates over them. However, the robot 102 may be any robot of any functionality and is not intended to be limited to floor-cleaning devices. Attached to the robot 102 is a scanning device 302 comprising one or more cameras 304 configured to capture images of objects and features as the robot 102 navigates along a forward direction 306, wherein the one or more cameras 304 are oriented along direction 308 at an approximately 90° angle from the forward direction 306 of the robot 102. This allows for the robot 102 to navigate straight while the scanning device 302 captures images of objects as the robot 102 drives past them, such as in grocery store aisles. The scanning device 302 may be configured to be coupled and/or decoupled from the robot(s) 102 to enable a floor scrubbing robot, or any other robot for that matter, to perform a new task of imaging the environment.

Images captured by the scanning device 302 may be communicated to a model configured to identify text, items, and other features, such as a neural network 214, variants thereof described above, or other model predictive systems (e.g., referential databases for similarity analysis). As used herein, use of a neural network 214 to identify features within images is intended to be an exemplary method of image-feature identification, whereas one skilled in the art may appreciate other methods of feature identification which do not utilize neural networks 214. More generally, these systems configured to identify a prescribed set of features in images are referred to herein as models. For example, image libraries, comprising a plurality of images of various features, may be compared to a given input image to determine similarities, wherein the similarities may indicate the presence of a feature within the image.

In some embodiments, the model(s) used to identify features in the captured imagery may be embodied within computer readable instructions executed by the controller 118 of the robot 102. In some embodiments, the neural network 214 may be embodied within computer readable instructions executed by a processing device 138 of a server 202, wherein images captured by the scanning device 302 are transmitted to the server 202 prior to the model(s) identifying features within the images. It may be preferable for busy robots 102 (i.e., those constantly in operation) and/or robots 102 with minimal available processing bandwidth (e.g., to save on cost of manufacture of the robot 102) to transmit the images for analysis external to the robot 102, however such step may incur extra costs for data transmission such as over cellular LTE networks or other channels.

Due to the scanning device 302 being oriented along direction 308, the robot 102 is only able to capture images of objects which are on the right-hand side of the robot 102. This constrains the possible directions the robot 102 may take when imaging an object, as will be discussed later. It is appreciated that the orientation of the scanning device 302 on the right-hand side is not intended to be limiting, wherein the scanning device 302 may be oriented on the left-hand side. In some embodiments, the scanning device 302 may be oriented along or opposite to the direction 306 (i.e., behind the robot 102) or the forward direction 306, wherein directional constraints are not needed to be considered when planning routes for the robot 102. In other instances, the scanning device 302 may comprise cameras 304 facing right and left to enable the scanning device 302 to acquire images on both sides of the robot as it navigates aisles in a store or warehouse. In other instances, a full 360° view camera may be utilized to image all the space around the robot 102 simultaneously; however, such cameras typically include substantial distortion effects which may add difficulty in later feature detection.

According to at least one non-limiting exemplary embodiment, the scanning device 302 may further comprise an additional camera (not shown) oriented upwards to capture images of tall objects, such as high shelves in a warehouse. Such camera may be enabled or disabled based on, for example, functional annotation constraints shown and described in FIG. 4C below.

According to at least one non-limiting exemplary embodiment, the robot 102 may be a single-purpose scanning robot configured specifically to capture images and have features of those images identified. Such embodiment may not include a scanning device 302 which can be coupled and decoupled to the robot 102.

According to at least one non-limiting exemplary embodiment, the scanning device 302 may further include additional sensor units such as a planar LiDAR sensor 310. The sensor 310 measures a range of distances along a plane approximately parallel to direction 306. The sensor 310 includes a range from approximately horizontal along the forward direction 306 to about 90 degrees upwards to account for the additional height of the scanning tower 302 as the base set of sensor units 114 may not have the ability to detect potential obstacles at the added height as the base robot 102 (i.e., with no scanning device 302) would otherwise not be required to detect or respond to such obstacles.

Figure 4A:
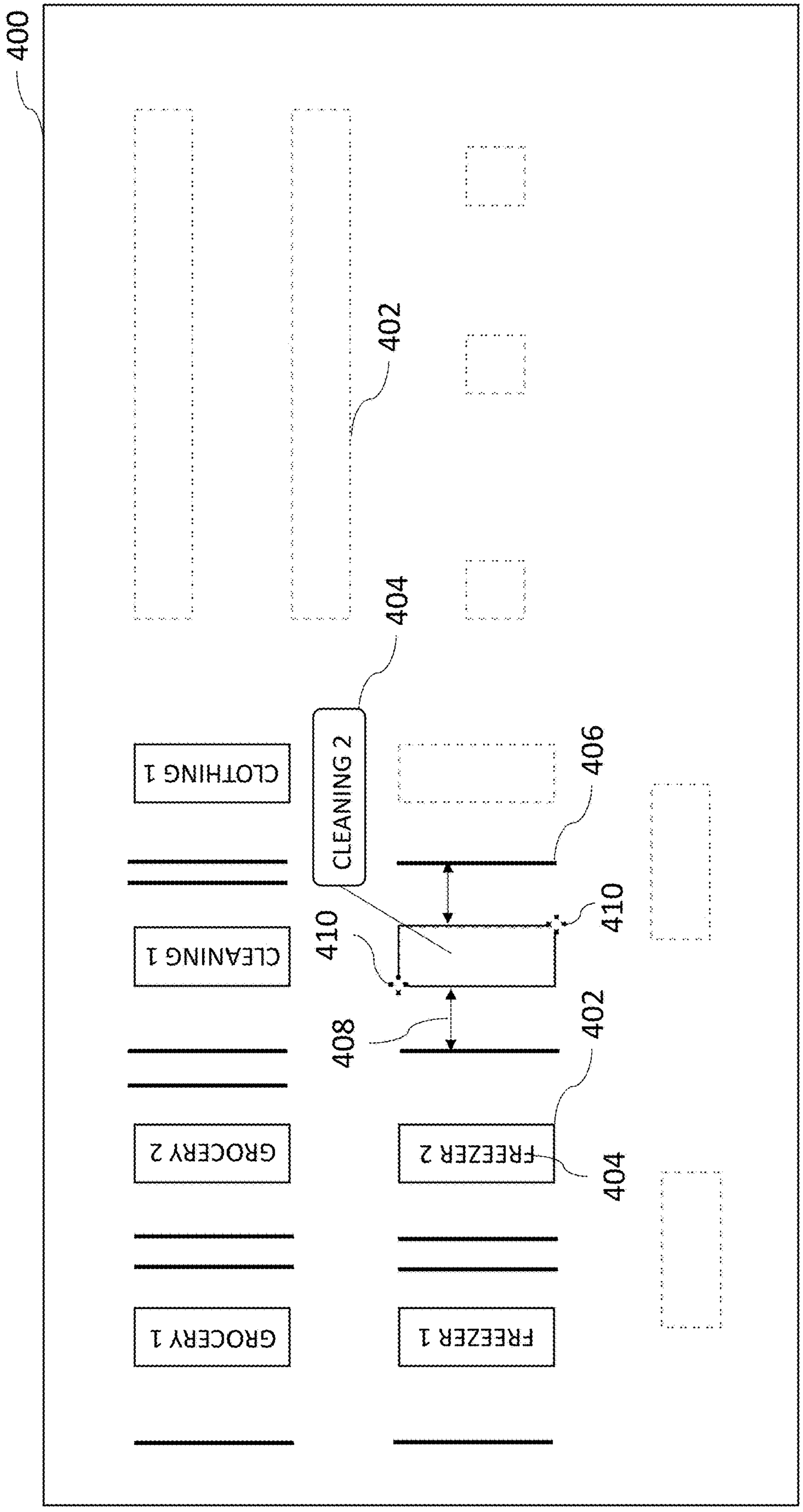
FIG. 4A-C illustrate annotations provided to a computer readable map and aspects thereof, according to an exemplary embodiment.

FIG. 4A illustrates a computer readable map 400 being annotated, according to an exemplary embodiment. The map 400 may be produced via a robot 102 navigating around its environment and collecting data from sensor units 114 to produce the map 400 based on locations of various detected objects 402. In some instances, the map 400 may comprise a combination of multiple computer readable maps aggregated together from one or many robots 102. For example, a first robot 102 may navigate a first portion of the environment and a second robot 102 may navigate the remaining portion, wherein the two maps may be aligned together to produce the map 400. The second robot 102 may also be the first robot 102 navigating the remaining portion at an earlier/later time than the first portion. The alignment may be performed via overlaying objects 402 sensed in both the first and second portions of the environment using, for example, iterative closest point ("ICP") and/or scan matching algorithms. In some instances, the map 400 is downloaded from another robot 102 or from a server 202 (e.g., using communications units 116).

According to at least one non-limiting exemplary embodiment, the map 400 may be produced and annotated following the disclosure of co-owned and co-pending PCT application No. PCT/US2022/030231 entitled "SYSTEMS AND METHODS FOR CONFIGURING A ROBOT TO SCAN FOR FEATURES WITHIN AN ENVIRONMENT", incorporated herein by reference in its entirety.

The computer readable map 400 may be displayed on a user interface, such as user interface units 112 of the robot 102 or a user interface of a device 208 coupled to the server 202, wherein the map 400 is communicated to the server 202, a copy is stored thereon, and is subsequently communicated to and displayed on the device 208. In this illustration, unannotated objects 402 are indicated by dashed outlines. The user interface may receive user inputs 410 that define regions occupied by the objects 402 detected in the environment as described above. The inputs 410 may comprise clicks with a mouse, taps on a touch screen, and/or other forms of receiving user input to denote a location on the map 400. The two inputs 410 shown may represent two mouse clicks that define the opposing corners of a rectangle, wherein the rectangle encompasses an object 402. In some embodiments, the user may click/tap and drag to draw the rectangle. In some embodiments, the user may be provided with a free-form shape tool to allow then to draw non-rectangular shapes, such as L-shapes. U-shapes, and/or circles to define the boundaries of the objects 402 which were sensed previously and placed on the map 400.

Once the area for each object 402 to be scanned is defined via inputs 410, annotations 404 may be added thereto. The annotations may comprise a name for the object 402 such as, for example. "Grocery n", "Cleaning n", and so forth (n being an integer) if the environment is a grocery store. In the illustrated instance, the user is providing an annotation of "Cleaning 2" to the selected rectangle. It is appreciated that the semantics used to annotate the objects 402 as shown are not intended to be limited to those shown in FIG. 4A-B, wherein the user may input any text as the label. Preferably, the text should be human readable such that a human may readily understand which object 402 the annotation 404 corresponds to when viewing an inventory report. These labels may be utilized in a final inventory report which may indicate that "item X" is detected in "cleaning 2", wherein it is preferable that a human reviewing such information readily knows where "cleaning 2" is. In this illustration, annotated objects 402 are indicated by solid outlines.

The annotations 404 may comprise three aspects; a semantic aspect, a functional aspect, and an exception aspect. The semantic aspect comprises a human-readable name, such as "grocery 1" or "freezer 2" which are readily understandable terms to humans. To illustrate, the systems disclosed herein may detect that a certain cereal brand is present, wherein a human reviewer may generally prefer the location be named "grocery" as opposed to a computer-readable alphanumeric. The functional aspect may configure different robotic behaviors in scanning objects 402 based on their annotation 404. For instance, freezer sections may require the robot 102 to capture images without flash/lighting as glare on freezer doors may obscure the images. These functional aspects are encoded within the annotation regardless of the semantic label. The function of each annotation may be pre-determined (e.g., any item labeled "freezer" causes the flash to disable) and selected from a list of pre-set functions for certain annotations, or may be customized to the environment (e.g., customized scanning distance 408). Lastly, the exception aspect is utilized when detecting and analyzing the identified features for exceptions as discussed for FIG. 5 below. For instance, the exception aspect may denote if an upper reserve shelf is present, wherein a robot 102 later detecting a pallet where there is no reserve shelf would generate an exception. As another example, the exception aspect may denote certain categories or departments of a store where certain SKUs should be seen based on a catalog of that store and, if a SKU is seen elsewhere, an exception can be generated. Like the functional aspect, the exception aspect is not impacted by the choice of word(s) used by the semantic label.

Once the annotations 404 are provided to the object 402, the user may be prompted to denote which sides of the object are to be scanned for features. Each face or side of the annotated objects may comprise a face identifier ("face ID") 405, or identifier that denotes each face of the annotated objects. Each face ID 405 may denote (i) if the face of the object should be scanned, and (ii) scanning parameters for scanning the face of the object 402.

Scanning parameters, as used herein, refer to a set of parameters that enable the robot 102 to accurately image features of objects 402. Scanning parameters may include, for example, speed of the robot 102, focal length of the cameras 304, which camera(s) 304 should be enabled for each object 402, a distance 408 the robot 102 should be at to capture high quality images, and/or any hardware states (e.g., disabling a scrubbing brush which may cause vibrations which blur captured images). Such scanning parameters may be defined within the functional aspect of the annotation 404 and/or face ID 405.

Figure 4B:
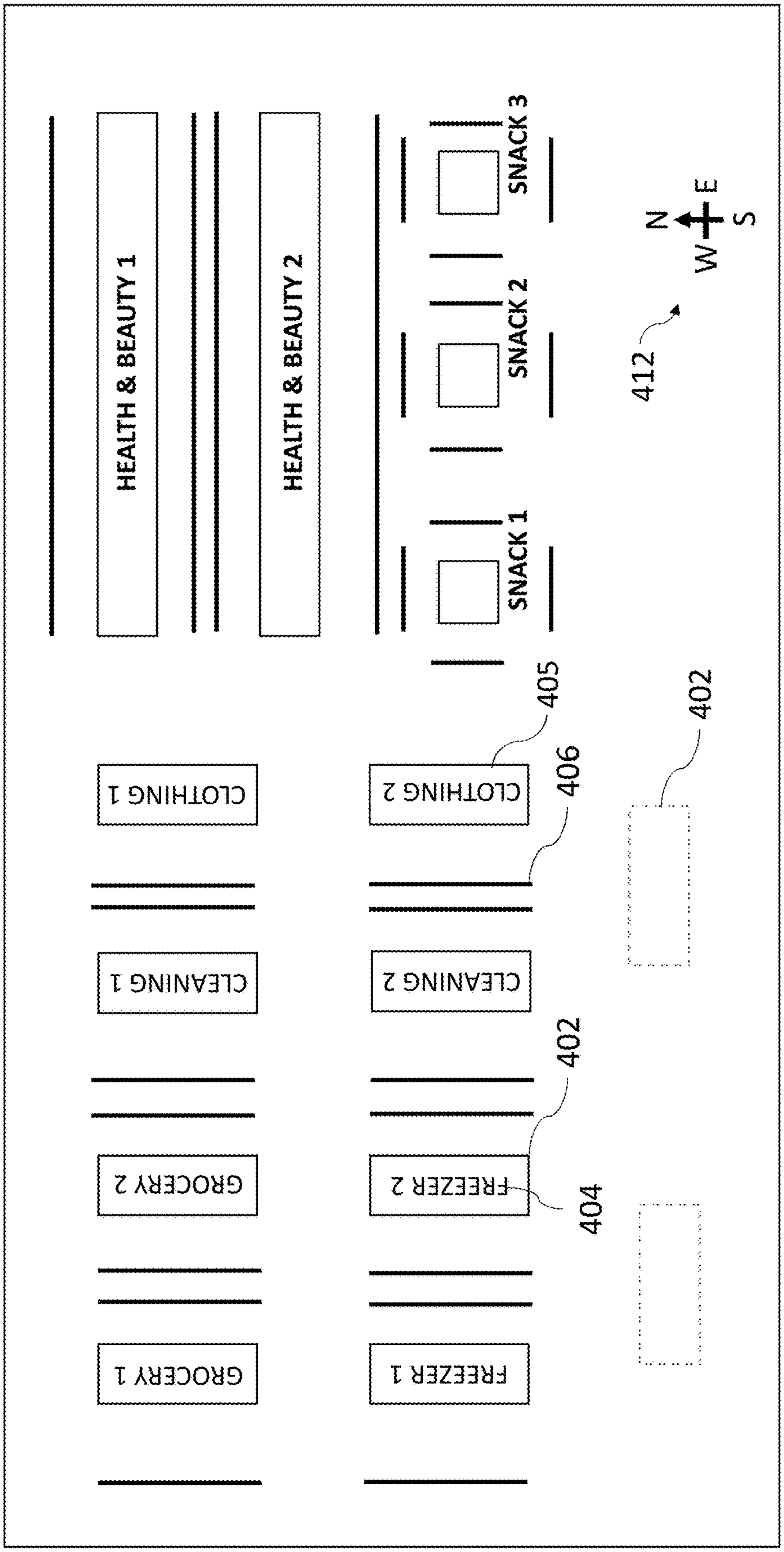

The scanning parameters may indicate a preferred scanning line 406 that runs parallel to one or more of the surfaces of the rectangular annotations of the objects 402 at a constant distance 408, the distance 408 being specified by the scanning parameters. More specifically, the scanning lines 406 are parallel to the face ID 405 that defines the scanning lines 406. FIG. 4B illustrates the same computer readable map 400 with all desired objects 402 annotated, according to the exemplary embodiment. As shown, each object 402 now comprises an annotation 404. Further, each scannable face of each annotated object 402 corresponds to a preferred scanning segment 406. Some objects 402 are left unannotated, indicating these objects 402 are not to be scanned for features (e.g., objects 402 may be cash register stations). Cardinal directions 412 are placed onto the map 400 to provide the user with defined directions. Cardinal directions 412 may be aligned arbitrarily, randomly, based on user input (e.g., the user may rotate the directions 412), and/or based on magnetic north (e.g., as measured by a magnetometer of sensor units 112). Alternatively, cardinal directions may be aligned to the store orientation (front, back, etc.) rather than a compass direction.

The cardinal directions 412 denote on which side of an object 402 a respective preferred scanning segment 406 is. For example. Grocery 1 includes a West and East side. Health and Beauty 1 includes a North and a South side, and Clothing 1 and 2 only include a West side. It is appreciated that, for some embodiments, not all objects 402 are oriented at 90° angles with respect to each other, wherein cardinal directions 412 may not always perfectly align with the direction of a preferred scanning segment 406. Accordingly, the direction assigned to each preferred scanning segment 406 may be based on whichever cardinal direction 412 best aligns with the direction of the preferred scanning segment 406 with respect to its corresponding object 402. In some embodiments, the direction may be denoted using intercardinal directions, such as North West. South East, etc, or any angles from "North" from 0 to 359°. The cardinal direction for each scannable side of the objects 402 may correspond with the respective face ID 405. These directions are largely semantic and used for organization of the images and detected features therein.

According to at least one non-limiting exemplary embodiment, each face of the annotated objects 402 may be annotated using unique names based on the cardinal directions 412. For example, the west side of Grocery 1 may comprise a first face ID 405 corresponding to the west side (e.g., "grocery 1 west) and a second face ID 405 corresponding to the east side. That is, for each scannable face of the annotated objects 402, the user may be required to input an annotation 404 for each scannable face manually, wherein the annotations 404 corresponds to the respective face ID 405. In other embodiments, the denotation of a "North/South/West/East" direction may be provided automatically by the controller 118 for each scannable face of each annotated object 402.

According to at least one non-limiting exemplary embodiment, the annotation user interface may further include a list of annotations with pre-determined functions, wherein the user may still provide the semantic label at their own discretion. For instance, the user may desire to annotate a certain section of the environment which has a display shelf, with products available to shoppers, and a reserve storage section or shelf above the display shelf, with products not available to shoppers. Such distinction will become useful in detecting exceptions as discussed below, for instance, when a robot 102 detects a reserve storage section when one should not be there or vice versa. Reserve storage sections are typically located above displays on tall shelves or racks, often requiring machinery (e.g., forklifts) to retrieve the items which are often placed on pallets in large bundles, wherein the bundles are typically assigned an SKU and a SKU label is affixed to the bundle/pallet. Accordingly, the user may select from a pre-determined list of functions to be applied to the annotation, where the user may in the above example select "YES" for the item of the list corresponding to the presence of an upper reserve shelf. As another example, the user may select "YES" for the item of the list corresponding to "disable lights" if the user is annotating a freezer section. In some instances, customized annotation parameters may be saved and re-used on other objects 402.

According to at least one non-limiting exemplary embodiment, higher level abstractions may be provided via the annotations to denote departments. Departments, as used herein, refer to a group of annotated objects 402 that contain similar features. These departments may encompass areas on the map or a selected group of annotated objects 402. Users may select one or more annotated objects 402 and assign them to a department label, comprising semantic information (e.g., "hardware", "cleaning" or other department name) used for organization and reporting clarity as discussed below. For instance, in FIG. 4B, "Grocery 1", "Grocery 2", "Freezer 1", and "Freezer 2" may all comprise a "Grocery" or "Food" departments, and milk detected on the "Grocery 1" object 402 may also be considered detected in the "Grocery/Food" department. As another example, a toilet plunger may exist in "cleaning 2" object 402 as part of the "hardware" department. The proper departments for individual items/features may be specified in a catalog 212, wherein detecting the products elsewhere would produce an exception. In some instances, department information may yield exception information when a detected product is incompatible with a certain department, such as frozen foods in a non-grocery section or cleaning chemicals in the grocery section, wherein such exception information may be encoded into the department annotation as illustrated next in FIG. 4C.

Figure 4C:
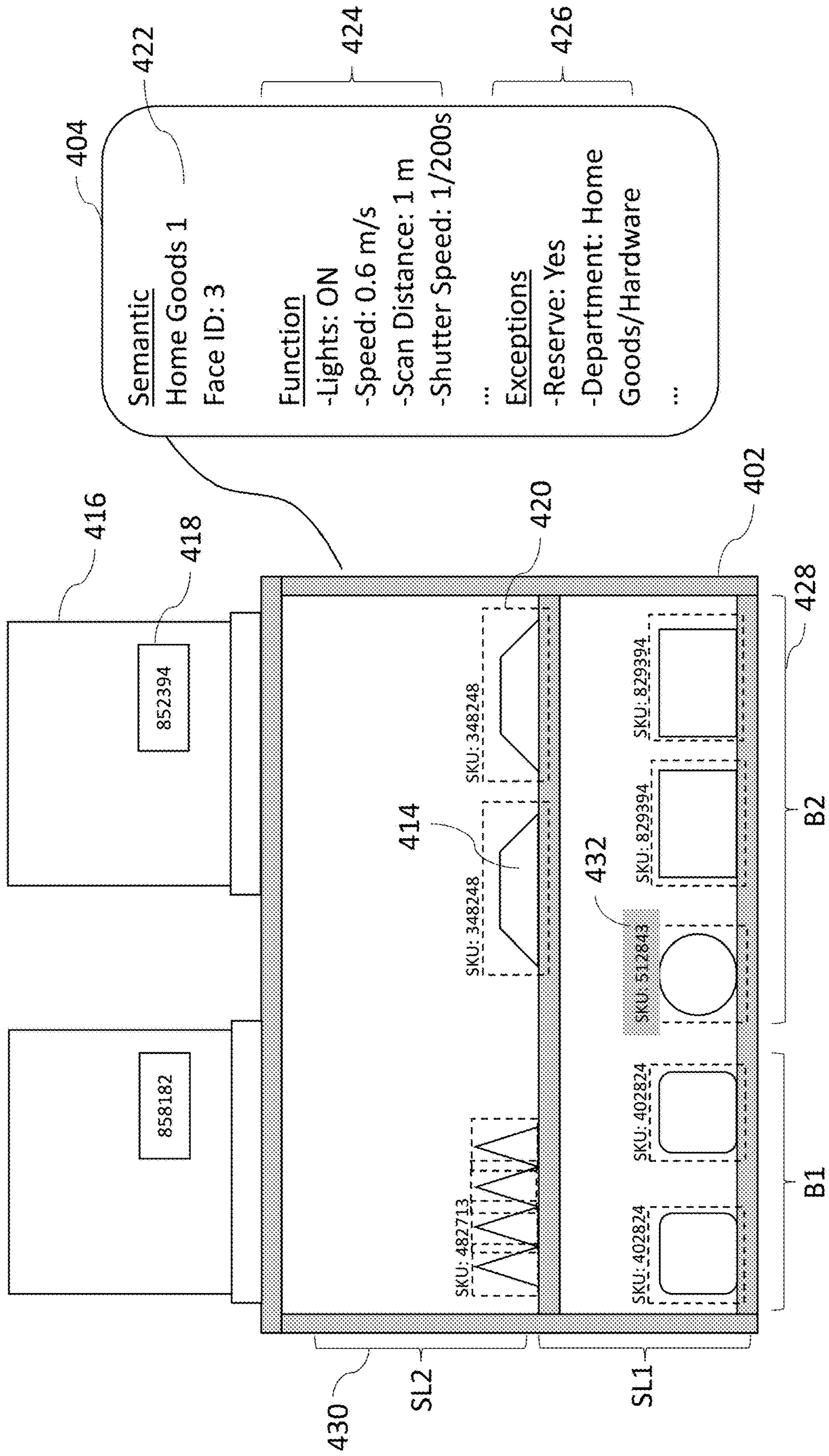

FIG. 4C breaks down the annotations provided to an annotated object 402, according to an exemplary embodiment. For the sake of illustration, the object 402 is a home goods display, however it is appreciated that the type of goods displayed is arbitrary and non-limiting. The user-provided annotation 404 first comprises a semantic label 422 that labels the object 402 as "Home Goods 1" based on a choice by the user which, preferably, is readily understood by a human to correspond to a location of the environment. The semantic label further includes the face ID 405 of third (3), indicating that it is the third face (or, as seen by a shopper, the shelf) in the "home goods" section, specifically in the first home goods object 402.

The functional annotation aspect 424 defines robotic behaviors in imaging the object 402 to obtain the highest quality images. These parameters may be pre-determined based on the hardware configuration of the robot 102 (e.g., camera properties, speed, size, etc.). For instance, the state of any lights may be defined as "ON" or "OFF", the maximum speed set, the scan distance 408 determined, and various camera properties such as shutter speed, exposure time, focal length, and the like are configured. In some embodiments, these parameters may be pre-defined based on the intrinsic properties of the cameras 304 and some parameters may not be changeable (e.g., cannot set maximum speed past safe limits). In some embodiments, these parameters can be uniquely defined for each annotation 404. In either case, if an adjustment to one or more of these functional parameters needs to be made to improve image quality, the user may adjust the functional aspect 424 of the annotation 404. Preferably, such functional aspect 424 may be experimentally determined to yield the highest quality images, which may require a skilled operator or the original equipment manufacturer of the robot 102 to perform such experiments to determine optimal scanning parameters.

Lastly, the exceptions aspect 426 defines various parameters used for exception detection. Exceptions will be discussed in more detail below but, in short, an exception corresponds to an outlier in data which may require further analysis. For instance, the exception aspect 426 includes a "Reserve" yes or no binary question. If a robot 102 detects a reserve pallet 416 at a location where this parameter is "NO", an exception is reported because this would indicate a reserve pallet (or other container) 416 is located where no reserve storage is or should be present (e.g., false detection or misplaced pallet 416). In the inverse case, where the robot 102 detects no pallets 416 where one can be (i.e., "YES"), such lack of detection may indicate out or low stock of a product which may also be denoted as an exception. Pallets 416 can be detected as distinct from other items 414 for sale based on (i) being imaged by a camera oriented to capture images of reserve storage areas, and (ii) a SKU label 418 affixed to the outside of the pallet, wherein the SKU corresponds to a pallet or other storage of product. In some embodiments, computer vision methods may also be utilized to identify reserve pallets 416 from other objects.

Annotators may, in some instances, create custom functional and exceptional sections in accordance with their use case and environment type. For instance, some environments may comprise reserve storage above a freezer object 402, wherein a configuration of a YES value to "freezer" and "reserve" denotations could be created for a first object 402, saved, and later applied to other objects 402. Such annotation will cause the robot 102 to disable lights when imaging the freezer doors and enable an upward facing reserve camera to capture images.

When capturing an image of the scene as shown in FIG. 4C, the robot 102 may not immediately identify all the SKUs for the items 414 present, rather instead the image is saved and can be processed later. It is appreciated that robots 102 may comprise limited computational bandwidth and may not be able to simultaneously navigate and identify the objects especially when there are many objects to be identified, wherein it is preferred to perform image analytics separate from the robot 102 (e.g., via a server 202) or while the robot 102 is idle. Accordingly, the image is saved in memory 120 and/or communicated to a server 202 for processing. In some alternative embodiments, the image is saved and will be processed via controller 118 once the robot 102 has completed its other tasks.

In performing the analytics, the server 202 may provide the image to one or more models. Such models may be derived from, for example, neural networks as described for FIG. 2B above. The models may also be derived from other sources such as, for example, comparing the features 414 of the image to a reference database (e.g., catalog 212) for similarity. The models may return bounding boxes 420 which encompass the pixels of identified features 414, wherein each bounding box 420 is encoded with a label corresponding to the SKU of the items 414 as shown. The image shown with the corresponding SKU labels 420 can be a portion of a report or inventory report provided to an end consumer. In FIG. 4C bounding boxes around reserve pallets are not shown but may be included for image analysis to confirm that the detected SKU 418 corresponds to an image of a pallet having SKU 418.

The report must now be analyzed for exceptions, or outliers in the data corresponding to issues that need to be actioned or addressed. More detailed processes and test steps are discussed below regarding FIG. 7 but, in short, the annotations 404 provided may be utilized to identify exceptions. For instance, if any of the function aspects 424 were not followed by the robot 102, such as the robot 102 navigating too close or too fast, the entire image can be denoted as an exception because the image may contain low-quality data. As another example, the exceptions aspect 426 can be utilized. The reserve section is "YES" and reserve pallets 416 are present in the illustrated scenario, thus no exception is generated for the two reserve pallets 416. If the section is not a reserve storage and the pallets 416 are detected, an exception is generated due to the misplaced pallets 416. However, one label 432 (grey highlight) is denoted as an exception based on, e.g., the SKU number not matching the department as denoted in a store catalog 212. For example, SKU "512843" may correspond to watermelons, which would not be denoted within the department of "home goods" or "hardware" in the store catalog and can thus be noted as an exception caused by, e.g., incorrect model predictions (i.e., object 432 is not a watermelon) or a misplaced watermelon. Alternative reasons for the SKU 422 generating exceptions may also include, without limitation, the SKU "512843" being invalid (i.e., does not correspond to a stocked product), the SKU missing a digit or including extra ones, or the SKU not matching what other feature identification models predict the feature to be based on the catalog and/or from reading price labels adjacent to the bounding box 420.

According to at least one non-limiting exemplary embodiment, planogram exceptions can also be considered. Planograms are reference, ideal shelf or product display layouts configured to optimize shopper buying potential, wherein arrangement of a display not in accordance with the planogram is sub-optimal and may therefore generate an exception to be noted in the report. The planogram reference data can be provided by the store associates, downloaded from an external source, provided by a catalog 212, or otherwise communicated to server 202. The planogram reference data include an arrangement of the display including the locations for each product denoted by SKU/UPC, wherein detecting SKUs in incorrect places and/or detecting SKUs which do not appear in the reference planogram data should generate an exception. In some instances, planogram exceptions may be undesirable. For example, items such as seasonal, sale or clearance items may be located in a more prominent spot than normally expected in an idealized planogram. In other words, planograms may, in some cases, be deviated from without issue, wherein reporting the planogram noncompliance as an exception is moot as no action should be taken. As will be discussed further below in FIGS. 7 and 10, the exceptions which are or are not reported are configured based on input from the end consumer of the report.

The faces can, in some instances, be further discretized into shelf and bin levels. Shelf levels 430 refer to the vertical height above a floor upon which items should be placed upon. Shelf levels 1 and 2 are shown corresponding to the first and second shelves above the floor. Shelf levels do not encompass reserve storage above the display. Similarly, bin level 428 discretization involves discretizing the face horizontally. The illustrated display contains two bins 428, B1 and B2, though other displays may contain more or fewer bins. Bins and shelve levels are utilized in the final report as a method of organizing the data and reporting product locations more precisely. Bins may be named alphanumerically, e.g., B1 and B2 as shown, or may be provided with human readable names, such as "wrenches" and "hammers" bins within a face of a "hardware" object 402. The annotator may provide the vertical and/or horizontal dimensions of the shelf/bin level annotations in a similar manner as the object 402 level annotations, wherein the user selects the bounds via inputs 410.

In some embodiments, the annotated object 402 may encompass a plurality of individual, adjacent shelves or displays separated by bars, edges, or other detectable features which may denote the beginning and/or ends of a display. These may, if so desired, be automatically assigned a bin whenever such dividers, edges, etc, are detected.

The final report may comprise a tabulated list of items 414 detected, the item 414 SKU, and the location, wherein the location may correspond to the semantic label 422 (i.e., "home goods 1"), a robot 102 location where the image was taken (e.g., in x, y coordinates or on a rendering of a map), department (i.e., "home goods"), and an image-space location (i.e., bounding box 420 location). The location may further include, in some embodiments, a bin identifier corresponding to a sub-section of an annotated object 402 (e.g., "screwdrivers" bin of the "home goods 1" face ID) and/or a shelf level. The report may further denote some detected exceptions, such as misplaced items, planogram noncompliance, price tag mismatches, and/or low or out of stock items.

According to at least one non-limiting exemplary embodiment, the tabulated report may be further provided at least in part via displaying the image(s) captured by the robot 102. The image may be a single image, or a composite image formed by, e.g., stitching sequential images together. The image may include bounding boxes 420 with corresponding SKU identifiers displayed thereon as shown. In some embodiments, the image may be provided on a display of a device 208 coupled to a server 202 which enables customers to select identified objects 414 to retrieve more information, such as price, product information (e.g., nutrition facts), online availability, and other more detailed information which can be retrieved from a store catalog using the SKU. In some embodiments, selecting one or more detected features may retrieve internal inventory data regarding that product, such as inventory and/or pricing information, if the device 208 is controlled by a store associate or manager as opposed to a shopper of the store (e.g., determined via credentials to the server 202). In some embodiments, the composite images may be utilized to provide a 3-dimensional ("3D") rendering of the environment, wherein bounding boxes 420 can be encoded in the 3D to provide remote access to view the environment.

In providing the final inventory report, only the exceptions which are actionable should be reported and the rest removed. An "actionable" item includes one which, even if some feature identification process is erroneous, the output can be verified by a human on site. As an example, an item detected adjacent to a price label for a different item could be the result of: (i) erroneous character detection (i.e., reading) of the price label. (ii) erroneous detection of the item from its imaged features, or (iii) a misplaced item, wherein a human may view the image captured to rapidly determine if case (iii) applies, which requires an action to move the misplaced item. The other two cases may take a mere matter of seconds to verify the product as humans are naturally strong pattern matchers. It is appreciated that the largest time cost for human store associates tasked with finding and correcting misplaced items is finding them to begin with amongst possibly thousands of items and product displays which is now handled entirely by the robot 102 and server 202 automatically. Although the system may produce some false positives (i.e., the system misread characters on a price tag and indicated a mismatch) such false positives are rapidly resolvable without significant human intervention. For instance, an associate my simply press 'resolve' button on their device 208 after briefly viewing the image and identifying that no price tag mismatch is truly present, wherein the displayed image may specifically highlight the potentially misplaced item for user convenience. Conversely, if an item is identified but no robot location/department is provided, it would be impossible to verify the product identification because it is uncertain where the product was sensed, even if an image is provided. Preferably the images should not be the sole source of ground truth as, for instance, the images may be occluded by passing humans or other defects in the cameras 304 (e.g., blur), wherein human associates should still be able to physically verify the imaged features are correctly identified or not even if the image itself is occluded.

Figure 5:
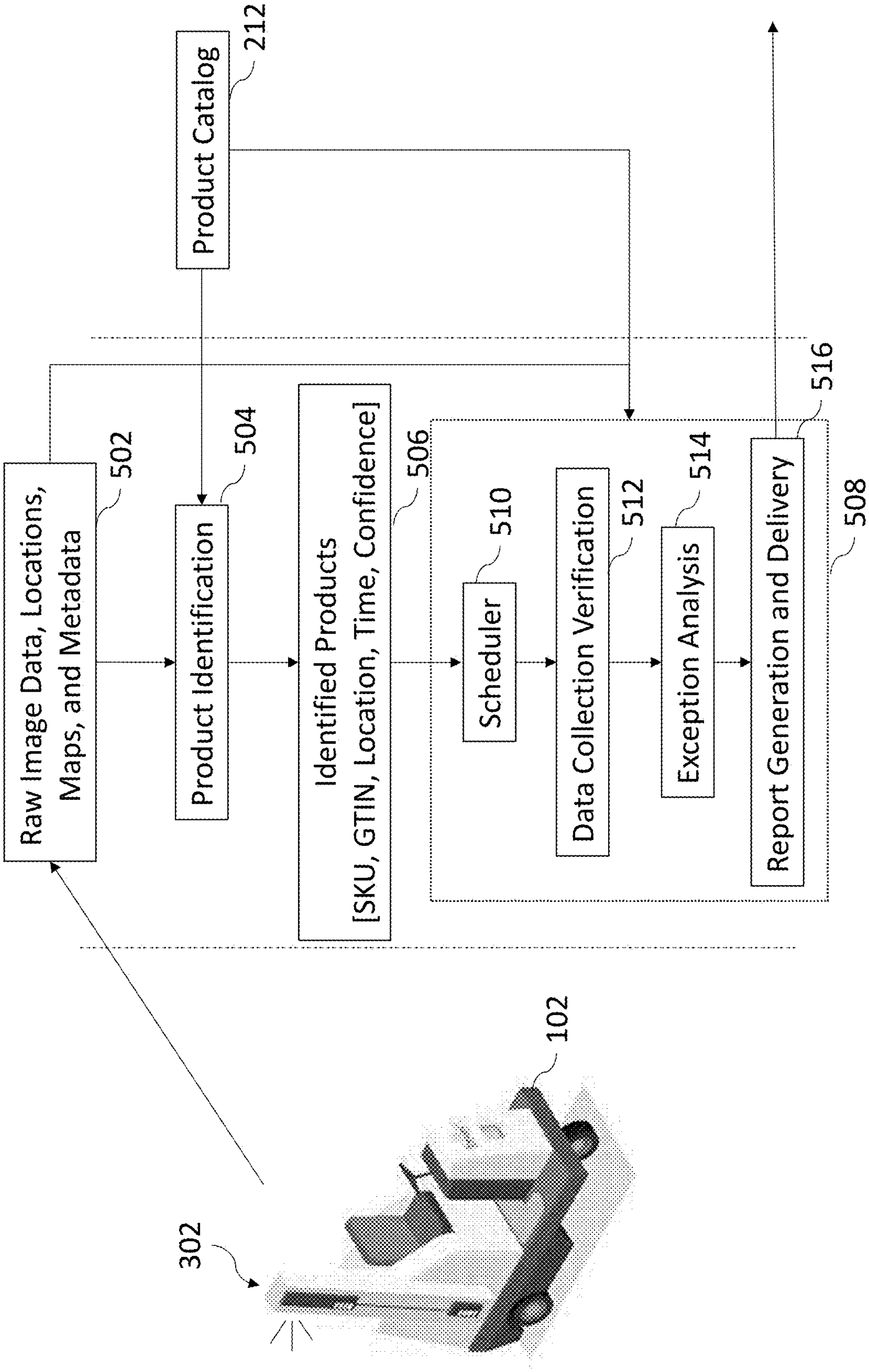
FIG. 5 is a process flow diagram illustrating a system configured to verify exceptions in feature detection analytics, according to an exemplary embodiment.

FIG. 5 is a functional block diagram of a server 202 configured to provide inventory reports using data collected by a robot 102, according to an exemplary embodiment. First, robot 102 data is collected as the robot 102 navigates. The data includes computer readable maps produced while navigating. The robot 102 may further include a module 302 configured to capture images of objects as the robot 102 passes by. During or after completing its task(s), the robot controller 118 may upload the images collected to the server 202 for analytics in block 502. The images captured by the robot may each be encoded with location information as metadata components which indicate where the robot 102 was during acquisition of each image. Such location information may include robot 102 (x,y) cartesian locations (or other coordinate systems) on a computer readable map, a face ID 405 of the face being scanned, the object 402 being scanned (e.g., denoted by semantic labels or others) and, if available, bin locations. Shelf level locations may be required to be provided. However, typically robots 102 translate horizontally rather than move upwards/downwards, wherein all shelf levels are scanned simultaneously as the robot 102 drives by. In some embodiments, module 302 may comprise cameras at a plurality of levels that may correspond to shelf levels. Shelf levels are primarily used in more precise product localization after the images are processed and features thereon are identified.

Next, the images and metadata are provided to a product identification process 504. Such process 504 may include the server 202 executing a plurality of models configured to identify certain objects in images with associated confidence. The models may also be provided with a product catalog 212 to serve as reference data, including reference images of SKUs, reference descriptions, and reference prices. Using the catalog 212, the models can be configured to identify products of the catalog 212 such that, when provided with new images from the robot 102 at block 502, the models can identify the products of the catalog.

According to at least one non-limiting exemplary embodiment, block 504 may be performed external to the sever 202 using a distributed network of devices 208, each executing various models. For instance, the data may be aggregated from one or more robots 102 onto server 202 and provided to an external processor 208 (e.g., Google Vision AI via use of an API), wherein the external device 208 may return the identification of the features to the server 202.

The product identification block 506 includes, for each product depicted in the images from block 502, identifying the corresponding SKU and GTIN from the catalog 212, location parameters from the robot 102 data, a timestamp also from the robot 102, and a confidence from the various models which perform the product identification. In general, an identification of an item is selected based on the highest associated confidence from a plurality of model predicted outputs, however other predictions from other models may also be stored for later exception analysis. The identified products in block 506 may comprise a table, with each row of the table corresponding to a unique product detection and columns may denote the location (e.g., department, bin, face ID, etc.), SKU/GTIN/UPC values, a storage type (e.g., reserve storage or on display for shopper purchase), and two predictions of the product; one from optical character recognition ("OCR") of price tag labels and another from image object detection ("IOD") based on how the object looks in the image. This aggregated table of analytics is subsequently analyzed for exceptions and errors using a post processor 508 and may be stored in an analytics report table.

The post processor 508 can be abstracted into four primary steps. First, the post processor 508 may begin with a scheduler 510 which initiates the retrieval of data based on a schedule. For instance, if the product identification 504 is performed external to the server 202, the scheduler 510 may cause the post processor 508 to wait for analytics results from the external entities to be fully completed before post-processing them. Alternatively, some environments operate on fixed schedules, such as opening/closing times or stocking/reshelving times, wherein the scheduler 402 may be configured based around these times at user discretion. In some instances, the scheduler 510 may stream data to the analytics live when received from a robot 102 rather than waiting for set times. If the analytics in block 506 is performed on the server, the scheduler may determine where and when the data is to be retrieved from memory. In some cases, the robots 102 are scheduled to scan for features at pre-determined times, wherein the scheduler 510 may initiate the analytics once a sufficient portion of the environment has been scanned for features or other conditions.

In some embodiments, the scheduler may initiate analyzing the product identification output 504 based on a temporal schedule (e.g., every day at 1 am). In other embodiments, the scheduler may operate based on functional conditions. For instance, some annotated objects 402 may be desired to have their features identified more frequently than other objects 402, wherein the scheduler may begin analysis of the identified products 504 which correspond to the high-frequency objects 402 once/every time they are imaged, or at different configured frequencies. In some embodiments, a mix of both temporal scheduling and functional scheduling may be employed. In some embodiments, image data are live streamed and processed when collected by a robot 102.

Next, block 512 includes data collection verification. Data collection in reference to block 512 does not refer to a robot 102 collecting images or sensor data of an environment, rather it refers to the collection of analytics data of those images and sensor data which ensures the data of the aggregated analytics table is valid and complete. Block 512, upon determining any item of data in the analytics report table is not valid according to various rules discussed below, denotes such items as exceptions. Exceptions, as used herein, correspond to identified items of data which are not expected, normal, or otherwise require further analysis to determine validity. For example, a product with a price of $0.00 would be an exception as it is not expected or normal for prices to be zero, wherein further analysis is required to determine the actual price of the sensed item. Exceptions may also be considered as flags for outlier data. The results of the product identification block 504 may be in the form of an analytics results table, with each row of the table denoting an identified product with at least its associated SKU, GTIN, location, timestamp, and associated confidence.

First, the data collector may perform checks to verify that the data from the analytics of the images is complete and is sensible. For instance, if any of the SKU, GTIN, or location fields are blank, incomplete, or obviously erroneous (e.g., SKU/GTIN is too short/long) the row of the table is noted as an exception. Analytics involving OCR should also never result in a price less than one cent, wherein "0.00" cost items can be flagged as exceptions and may be the result of blurry images causing digits (e.g., 8) to appear indistinguishable from a zero. The data collector may also aggregate other data, such as robot location information, metadata, site information, robot 102 identifiers, and other information not provided to or utilized by the analytics. These data items may be added to each row for each detected item in the aggregated analytics table.

Next, the detected objects are verified to correspond to actual products in the environment. The server 202 is provided with a product catalog 212 which denotes the products displayed in the environment. The product catalog 212 may include a product name, description, SKU, GTIN, and price for all objects to be detected and identified by the system. The catalog 212 may represent data stored in another server, database, or computer system in communication with server 202. In some instances, the catalog may also include images, which provide useful references for object detection analytics, and detailed descriptions of the product, which may be used for verifying OCR results using price tag labels. In verifying the OCR output from the analytics, the product name seen on the price tag should correspond to a product in the catalog and, if there is no reference to the detected item in the catalog, an exception can be identified. For example, an OCR system may misread blurry text and return incorrect SKU's, prices, and/or item descriptions, thereby producing erroneous or illegible results which would not match the catalog and can therefore be denoted as exceptions.

To illustrate how exceptions can be detected by the data collector 514. FIG. 6 illustrates an exemplary analytics results table according to an exemplary embodiment. The table has been retrieved via the scheduler 512 and populated based on analytics performed on data collected by sensors of a robot 102. The columns of the table represent a category of product (e.g., available to shopper, "shelf", or not available, "pallet"); optical character recognition ("OCR") results from reading price tags, product packaging, and product labels; image object detection ("IOD") comprising identifying objects based on their depiction in images; SKU; GTIN; a brief description (if any can be retrieved); a detected price via OCR; and a location where the product was detected. The category type can be determined via IOD or other methods such as data from LiDAR sensors to detect a shape or may be encoded within the exception aspect 426 of the annotations 404.

According to at least one non-limiting exemplary embodiment, an object detected via IOD can be corresponded to a price label, detected via OCR, based on its proximity to the price label. In some embodiments, additional consideration is given to the text on the label and the specific product identified. For instance, two products A and B are adjacent to a label for product A, wherein product B is closer to the label for product A (e.g., due to shoppers moving the products). Accordingly, additional weight may be provided to the correspondence of the detected label with the detected product A such that the processor determining the correspondence is more biased to assigning the detected product A and the detected price label to the same line item in the aggregate analytics table (e.g., using a weighted equation, neural network, etc.). In some embodiments, the processor may be further biased based on the confidence associated with IOD and OCR predictions. Returning to the example of products A and B adjacent to label A, the processor may be more biased towards the higher confidence IOD prediction. If product A was detected with low confidence, there may exist a higher likelihood that product A is not correctly identified and thus should not be corresponded to the price label and product B is misplaced adjacent to the wrong label. Preferably, and without limitation, spatial distance between a detected product and a detected price label should carry the most weight (as this would be most reflective of a shopper's experience), followed by the OCR detected text and IOD results, and lastly the confidence, although additional parameters may be considered based on the environment.

In some embodiments, images of displays stored in an upper reserve shelf and imaged by a reserve camera are automatically denoted as "pallet". In other embodiments, reserve pallets are affixed with SKU labels which denote them as storage pallets with a corresponding product, wherein the labels can be detected via OCR and subsequently identified.

It is appreciated that the specific semantic labels provided herein are not intended to be limiting. Terms such as "pallet" denote a large collection of a product typically for storage and not for sale to shoppers, whereas items on a "shelf" would correspond to products available for sale and accessible to shoppers. Alternative semantic labels such as "available" and "not available", "reserve" and "sales floor", or even alphanumeric codes denoting similar categories are possible without limitation.

Each row of the exemplary table includes one or more exceptions for illustrative purposes, though it is appreciated that not all feature detections will generate exceptions. In the first row, either one of the SKU or GTIN may conflict with the provided catalog 212 and are thus noted as exceptions, as shown by the grey highlight. For example, the detected SKU may not match the corresponding GTIN in the catalog, the SKU and/or GTIN of the catalog may not match the product detected by IOD or OCR, or the SKU and/or GTIN do not exist in the catalog 212. In the next row, the price of $0.21 for a six pack of energy drink does not match the catalog price for a six pack of "Creature Energy Drink" and is accordingly identified as an exception. Additionally, in the second row, the object was detected while the robot 102 is in the "Grocery 3" section, which is encoded to not include reserve storage, thereby indicating pallets should not be seen in this section based on the annotated map. If the robot 102 detects a reserve storage pallet or item, based on a SKU/GTIN which indicates the item is reserve storage, the detection is noted as an exception. In the third row, the robot location where the image was taken is either missing or invalid and is thereby noted as an exception. Lastly, in the fourth row, the OCR and IOD disagree on the product sensed and are noted as exceptions. Exceptions do not necessarily indicate a source of an error (e.g., OCR versus IOD in the fourth row) but rather may indicate that an error occurred, wherein the error can originate from the analytics (as in row four), the catalog 212 itself containing errors, or the product being detected in the wrong place next to the wrong price tag (as in row two).

According to at least one non-limiting exemplary embodiment, the table may further include an additional column comprising a hyperlink to the product in the catalog, wherein lacking a hyperlink to the catalog could be an exception. Such exception may indicate the catalog is incomplete, has dead or expired links, or that the item referenced in IOD is invalid (e.g., no longer in stock).

According to at least one non-limiting exemplary embodiment, annotations provided on the map used by the robot 102, as described in FIG. 5A-B above, may provide additional definitions for exceptions. For instance, products of the catalog can be associated with certain departments, e.g., grocery, freezer, hardware, etc, which can correspond to the annotations provided to the map. Such annotations may comprise a pre-set configuration which would denote certain products should or should not be detected in certain ones of these pre-set configurations. As an example, a SKU corresponding to a screwdriver being detected in "Freezer X" would yield an exception, wherein the annotation of "Freezer" would define certain products to be included and excluded based on the catalog 212. As another example, the annotation "Hardware" would generate exceptions if a product corresponding to grocery, based on the data in the catalog 212, was detected in the "Hardware" section. In some instances, operational constraints are considered, for example detecting fertilizers in the produce section or detecting a frozen food item outside a freezer/fridge should produce an exception.

Returning to FIG. 5, once exceptions are analyzed, the report may be generated and delivered to the user in block 516. Generation of the report may include tabulating the identified products 506 results into a table which includes noted exceptions. The report generation block 516 may further filter exclusions, comprising exceptions that cannot be validated in person, which are filtered from the final report. For example, exceptions including invalid identifiers (e.g., invalid SKU, robot ID, location, GTIN, etc.) are removed from the report as these unknown products cannot be verified as present at an unknown location. In some instances, the report may filter properly identified products so that the report generated shows only exceptions (i.e. the report is an exception report) to allow a user to concentrate on the exceptions.

Figure 7:
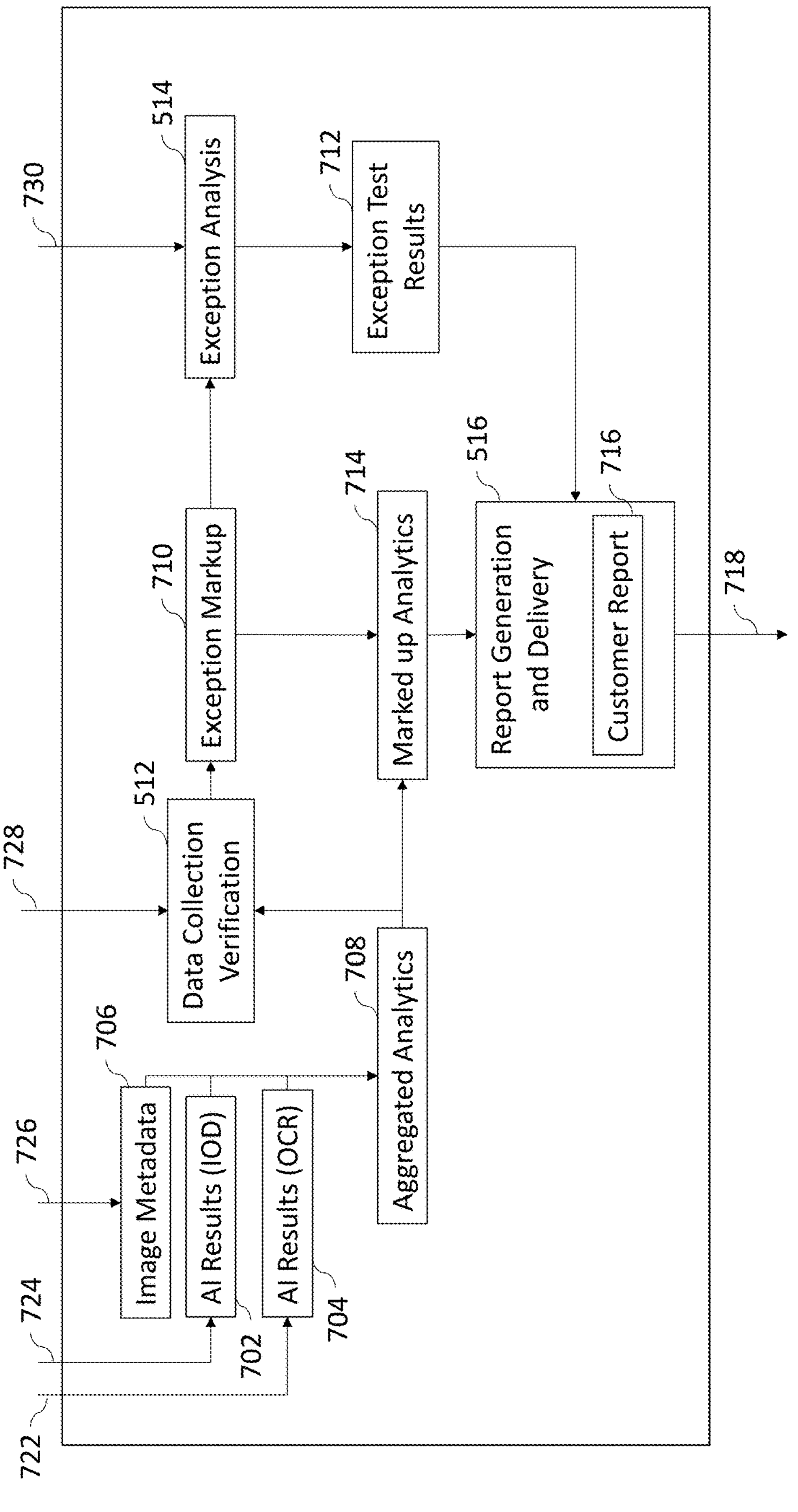
FIG. 7 is a functional block diagram illustrating a system configured to implement a post processor to identify exceptions and filter exclusions from feature detection reports, according to an exemplary embodiment.

FIG. 7 is a functional block diagram illustrating a server 202 system configured to generate customer reports 716 to be delivered to an end user, according to an exemplary embodiment. The illustrated system is configured to implement the functional blocks 510-516 of the post processor 508 described in FIG. 5. An end user or customer of the reports 716 may be, for a retail example, a store associate, a store manager, upper-level executives (i.e., managers of multiple stores), or shoppers within the stores, wherein the information provided to each may be different based on respective credentials. It can be appreciated that different customer reports may be accessible to different users. That is, store associates and store managers may be permitted access to different information than that available to shoppers. For example, store associates and store managers may have more use for location exceptions than shoppers in order to correct misplaced items. Shopper-accessible customer reports may be limited to expected location and price of a product and exception reports may be limited to low/no inventory exceptions. Presume at least one robot 102 has navigated an environment and collected a plurality of images of the environment to be analyzed for features depicted therein. It is appreciated that the processes carried out by each functional block are illustrative of a processor of the server 202 executing computer readable instructions from a memory. Various inputs 722, 724, 726, 728, and 730 are shown arriving to the server 202 from external sources, such as external systems; however, it is appreciated that such data may already be communicated and stored on the server 202 prior to any of the functional blocks described herein performing their respective processes. In some embodiments, the incoming images from the robot 102 are analyzed to generate the customer report 716 on an hourly, daily, weekly, etc, schedule or on request from a user.

The server 202 begins first by receiving two sets of analytics results: OCR 704 from reading computer codes (e.g., quick response/bar codes) and text on labels (e.g., price tags), as well as IOD 702 based on analyzing image-based features of an object to identify the object, as discussed above for FIG. 6. The results 702, 704 include model-based predictions of what is depicted in the images captured by the robot 102. In some embodiments, the two results 702, 704 may be generated via a processor of the server 202 executing instructions from a memory. In other embodiments, the images captured by the robot 102 may be communicated to an external server which performs the analytics to identify items in the images and returns the results 702, 704 to the server 202. Each price label detected by the OCR 704 may be corresponded to a nearest identified product by IOD 702, within a threshold range to account for missing items. In other words, inputs 722, 724 may correspond to (i) image data captured by the robot 102 if the analytics are performed by the server 202, or (ii) analytics results from an external source if the analytics are performed external to the server 202 (e.g., using Google Cloud® Vision AI), wherein the image data captured by the robot 102 would be provided to the external analytics. The image object detection results 702 may include bounding boxes, or regions of pixels which are encoded with a particular label that, typically, is a SKU or GTIN retrieved from a catalog 212 but may also contain a product name. More specifically, the item is identified based on its appearance and, based on the identification, the SKU/GTIN identifiers are retrieved from the catalog 212. The assigned label is further associated with a confidence, or measure of certainty that the prediction from the IOD model is correct. The OCR results 704 may contain detected price tags (e.g., via a bounding box), the text written on said tags (e.g., the price), a product description (if one is present including, e.g., promotions and sales information), and/or any computer readable codes (e.g., bar codes, quick response codes, etc.), each also comprising an associated confidence. The AI results 702, 704 may comprise a list of identified features per image, wherein each identified feature within each image includes bounding box information and product (e.g., SKU) information.

The server 202 may aggregate the AI results 702, 704 with image metadata 706 corresponding to each image captured by the robot 102 and analyzed for features. The metadata 706 may include, for instance, site identifiers (e.g., store number); robot identifiers; a timestamp; and location information such as a face ID, a bin ID, an (x,y) robot 102 position; and/or annotation 404 information associated with the object being scanned at the location of each image. Aggregated analytics 708 may comprise a table of values similar to the table shown in FIG. 6 above, wherein the IOD results 702 and OCR results 704 are appended with metadata 706 (e.g., "category" and "location" columns). Since the AI results 702, 704 are each performed independently using the images captured by the robot 102, metadata of which is provided from the robot 102 to the server 202, the server 202 can correspond metadata for each image with two AI results 702, 704.

The aggregated analytics 708 are provided to the data collection and verification process 512, which identifies exceptions and validates the entries in the aggregate analytics 708. First, regarding the validity of the data, the data collection and verification block 512 determines if any entries of the aggregate analytics 708 is incomplete, missing, or corrupted, SKU, GTIN, and UPC codes have an expected length, wherein longer/shorter strings would be invalid SKU, GTIN, or UPCs and are thus marked as exceptions. If any of the metadata for any of the images provided in block 706 is incomplete, the aggregate analytics entries 708 of those images are marked as exceptions. Additionally, the exception aspect 426 of the provided annotations 404 for each object are processed to identify exceptions. Regarding reserve storage, detecting any reserve pallet 416 in a location where reserve storage is not present should automatically generate an exception, wherein the image metadata 706 and annotated computer readable map can be utilized to determine if a reserve section should be present for each image. Conversely, failing to detect a reserve pallet 416 where reserve sections are present may be noted as an exception due to low inventory. Further, any product detected by the AI results 702, 704 should correspond to a product, SKU, or GTIN in a reference catalog 212 and, if the predicted SKU/GTIN is not found in the catalog, an exception is generated. The catalog 212 may be provided via input 728 to the server 202 from an external data source 206. These and other exceptions described elsewhere in this disclosure are not intended to be limiting. An exception may be generated for any case wherein feature identification data is not complete or contains disagreements (e.g., between OCR 722 and IOD 724, or disagreements about what should be present and what is present such as low/out of stock, misplaced items, planogram non-compliance, etc.) depending on the use case and type of environment/features being sensed and identified. For instance, some environments may not include exceptions for reserve pallets, whereas some may, and others may utilize different means for reserve storage instead of pallets.

Secondly, some exceptions are produced for other logic-based reasons which are verified via the data collection and verification block 512. For instance, in some embodiments, any prices below 1 cent are noted as exceptions as prices of zero cents are nonsensical and likely a result of OCR failing to resolve blurry numbers on price labels (e.g., zero versus eight). Similarly, prices above a threshold amount may be treated in a similar way (e.g., OCR does not resolve a period in $399.99, instead reading $39.999), wherein such threshold may be based on the highest priced item in the catalog 212. In some embodiments. OCR 722 and IOD 724 disagreeing on a product depicted generates an exception as this may be the result of either or both models failing, or may be a misplaced item (i.e., price tag does not match the adjacent item). In some embodiments, the OCR results 704 may include a GTIN or UPC detected based on a barcode or other code/label, wherein exceptions can be reported if (i) the IOD results 702 predict an item which is different from the GTIN in the catalog 212, or (ii) the GTIN does not correspond to an item in the catalog 212.

According to at least one non-limiting exemplary embodiment, location or category-based exceptions are also identified. For example, a grocery store may include refrigerated produce and non-refrigerated products, wherein detecting items in the improper location may damage or spoil the product and therefore should be reported as an exception if detected. The proper location, category, or department for a product is provided via the catalog 212, wherein a product identified via IOD as a SKU/UPC/GTIN which, as specified by the catalog 212, is in the incorrect location is marked as an exception.

According to at least one non-limiting exemplary embodiment, occurrence-based exceptions are detected. An occurrence-based exception occurs when the occurrence of a detected product is an outlier, such as comprising 5% or less of detections or 95% or more of detections for a given annotated object, department, or the environment as a whole. Cases where features are identified in rare cases typically are a result of faulty analytics or inconclusive data (e.g., blurry images). Similarly, cases where there are excessive numbers of detections for a single feature may be the result of erroneous robotic localization which may cause duplicate identifications of a single feature.

Lastly, exceptions due to robot 102 behavior are analyzed. For instance, if the robot 102 determines that it deviated from the ideal scanning segments 406, using data from its sensor 114 and navigation 106 units, by greater than a threshold amount, the entries in the aggregated analytics 708 derived from images captured during that deviation may be noted as exceptions. If the robot 102 failed to implement any hardware states specified by the functional aspect 424 of the face ID 405 or annotated object being scanned, such as speed limits, distance to the object scanned (e.g., deviating from scanning segments 406), camera properties, and/or light/flash states, the images captured during such failure can be noted as exceptions. The hardware states of the robot 102 during capture of the images may be included in the metadata 706 associated with each image to verify the annotation functional aspects 424 are being followed.

In some embodiments, scan coverage can be considered. Scan coverage indicates the percentage of an annotated object that was imaged by the robot 102. The area covered by the images captured by the robot 102 may be calculated via calculating the area of a face ID encompassed by projecting the FoV of the cameras 304 onto the map and, for each pixel of the face ID encompassed by the FoV, denoting those pixels as "scanned". Or, conversely. "not scanned" if they have not been encompassed within the calculated FoV. Images of a face ID that was not fully scanned (i.e., over a threshold percentage) can be marked as an exception to denote the incomplete scanning. Repeat images of a same portion of a face ID can also be marked as exceptions and/or filtered from consideration to avoid double counting and reduce computations performed.

The data collection and verification block 512 produces an exception markup, comprising a tabulated list of items in the aggregated analytics table 708 which are denoted exceptions. The exception markup 710 may further include one or more reasons for exception, such as any of the above reasons discussed (e.g., improper scan distance, price tag mismatch, invalid SKU, robot ID not found, etc.

The exception markup is combined with the aggregate analytics table 708 to produce a marked-up analytics table 714 which includes the original analytics 708 with exceptions (and reasons) denoted therein. The "reasons" for exceptions may be encoded using a bitmask, wherein columns of the aggregated analytics table 708 each correspond to a bit of the bitmask. A value of one (1) may indicate a certain field contains a potential error, conflict, or missing data, and a value of zero (0) indicates the data is proper.

The exception markups 710 may also be provided to an exception analysis block 514 which comprises various tests to determine if each exceptional item should or should not be included in the final customer report. An exclusion, as used herein, comprises an exception which is not included in/filtered from a final customer report. Exclusions will encompass cases wherein no human verification can resolve missing or conflicting data given the valid data available. Exemplary exclusions may include, without limitation, missing location information for an image (e.g., robot location, department name, face ID, etc.), as any such feature data that cannot be corresponded to a location is useless and unverifiable; missing SKU/GTIN as the product cannot be corresponded to one in the catalog 212; no price or extreme prices (e.g., $3000 from a label containing $30.00) being detected either via OCR 722 or referencing the catalog, as price mismatch/noncompliance cannot be performed if no price is detected, or if the price detected is clearly erroneous there is no need for verification (e.g., $0 price tags). Exceptions which persist to the final customer report may include instances where the noted exceptions can at least be verified by a human such as, without limitation, an item in the catalog 212 detected in the wrong department, wherein the human may determine if it is a misplaced item or incorrect IOD result 724 (assuming both department and IOD 724 are valid inputs); out of or low stock; misplaced reserve storage detections (e.g., human may determine storage is improper or reserve is low stock); and others described herein or readily understood by a person of ordinary skill in the art for a given use case and environment type. Preferably, the exceptions should be verifiable using the raw image captured by the robot alone without the need for the human to visit the site in person, as will be explained below.

Based on the particular needs of the environment or the end-consumer of the report, certain exceptions may be included or excluded from customer report 716. As discussed above, the customer report 716 may have filters to include or exclude certain exceptions based on the customer's need to know the exception or whether the exception is actionable by the customer. In some cases, non-actionable exceptions are not reported. Non-actionable exceptions include exceptions which cannot be resolved via a human in the environment. For example, some retail stores have no control over the catalog 212 of products they sell, wherein a catalog 212 not containing a location would be a non-actionable exception for an associate in the store. The same exception, however, may be actionable for corporate management of the store to update their catalog and could be reported if requested by the management. In some cases, such as misplaced products or low occurrence exceptions may be actioned via displaying an image of the identified product for human review and possible corrective action, however some environments may not desire human review. In some instances, the end consumer may desire the report 716 to only include positive detections of sufficient confidence, wherein feature detections below a certain confidence (e.g., IOD and/or OCR confidence) or negative detections (e.g., missing products) are excluded. To summarize, the exception markup 710 is provided to a customized exception analysis block 514 which excludes/removes detected exceptions based on the particular needs of the end consumer, wherein various filters can be configured to exclude exceptions which are not desired to be reported. The particular exclusions desired are received via a signal 730 from the end consumer which configures the various filters for reported exceptions and/or exclusions form the customer report 716.

Notable exclusion cases include, without limitation; invalid location, invalid description, invalid SKU/GTIN, and/or in some cases invalid posted price. Invalid locations include entries of the exceptions markup table 710 which include missing or erroneous location information, too long/short strings, or invalid values (e.g., $0). Even if products are correctly identified by OCR 722 and IOD 726, without knowing where the product is located based on the robot 102 location during detection, such information is not actionable. Further, if no expected location is provided by the catalog 212, no action can be taken to place the identified object in a "correct" location. Invalid locations could include the aggregated analytics 708 table failing to denote a site location (e.g., store name/number), a robot location (e.g., (x,y) on a 2D map), and/or department/face ID information (e.g., which face, and/or where on the face is the item found).

Descriptions are determined via OCR 722 from price tags/labels. Such descriptions should, for a given product, match a description provided in the catalog 212. If the description does not match any item of the catalog 212 (including those which OCR 722 and IOD 724 do not identify the item to be), then the item cannot be verified to be a real or valid item. Typically, this case occurs when OCR 722 misreads a description due to poor image quality, such as scrambling letters, character misidentification, and/or providing nonsensical character outputs (e.g., due to blur) which cannot be verified by a human. Additionally, missing a description entirely would generate an exclusion for the same reason. Such description exclusion may be based on a threshold number of characters detected and may not require a perfect match to all characters in the catalog description. For instance, an 80%, 90%, 95%, etc, character match between OCR 704 and the catalog would be sufficient to determine that the imaged product corresponds to the substantially similar description in the catalog, even if a few individual characters are misidentified.

One notable case for the description exclusions is if the detected description detected does match (within threshold variance as described above) with any one or more items of the catalog 212 while IOD 702 identifies the item as a different one based on how the object looks in the image, the item should not be an exclusion. In this case, since the description does match at least one item of the catalog 212, a human may physically review the scanned area (assuming the location data is valid) to determine if the at least one item in the catalog 212 is truly present (misplaced item), or if price tag labels are misplaced adjacent to improper items. This instance should be reported as an exception due to the possibility of a misplaced price tag label or misplaced item, both of which are actionable insights provided the other remaining exclusion cases are not met. If the IOD 702 is incorrect, the human would immediately recognize such upon viewing the image costing only a marginal amount of time to determine if any action should be taken.

Invalid price exclusions may arise from two sources: invalid reading of a price label, or the catalog 212 containing an error. In the first case. OCR 704 may read a price label improperly, causing the detected price to be unreasonable. For instance, a blurry image may cause a period to be unresolved, leading to a $50.00 price to be detected as $5000. As another example, it may be the case that all prices in an environment end in "0.99" or "0.98" or similar values, wherein reading a different value such as "0.90" (e.g., the nine or eight being resolved as a zero) would indicate an invalid price read. Invalid price readings may also comprise invalid data entries such as zero, nulls, or alphabetic characters. In some instances, the catalog 212 may be missing a price or contain an invalid data entry, wherein detection of an item not in the catalog 212 is not actionable and therefore should be excluded. Specifically, it may prompt a human to respond to a non-existent item.

If the number of exclusions produced for a given number of items detected or face ID's scanned exceeds a threshold number, the entire data set may be flagged for review. Substantial number of errors may arise when, for example, the robot 102 encounters a mechanical fault or change (e.g., damaged/dirty camera lens), the annotated map being improperly configured, or the environment changing without updates to the annotations provided thereon.

Generally, exceptions which persist into the final customer report 716 include potentially erroneous object detections, price tag conflicts between a display price and expected price in the catalog 212, process compliance violations, and others discussed herein, all of which could be verified by a human on site. Process compliance violations may include, for example without limitation, incorrect price label values, incorrect items adjacent to price labels, missing/low stock, planogram noncompliance, sales/promotion compliance, safety compliance, and/or other environment specific considerations. Consumers may further specify additional exceptions or exclusions based on their needs or abilities to resolve issues (e.g., a catalog 212 lacking an expected department/location field may not be resolvable by an on-site associate but may be resolved by management). Lastly, in some instances consumers may only desire to have highly confident (e.g., above a threshold) and positive detections reported, wherein low confidence detections are excluded from the report. In other instances, however, consumers may desire to include IOD and OCR conflict exceptions which can be resolved via a human associate viewing the image of the feature on, e.g., a mobile device application. In addition to the reported exceptions, other identified features are also included in the customer report 716.

To illustrate further. IOD 724 may identify an item as X whereas the OCR 722 identifies it as Y, where both X and Y correspond to items in the catalog 212 and all other data fields are valid. From this data alone it is possible for item X is misplaced, or one of the inputs 722, 724 is erroneous. Accordingly, such instance may prompt a human to verify the stock either by (i) going to the physical location if convenient, or (ii) viewing the image captured by the robot 102 (e.g., as displayed on a mobile device that provides alerts for low/out of stock detections). Advantageously, providing the image to the user may enable quick and remote identification of misplaced items, enabling them to identify and move the item without having to visit and observe the display in person. If the item is misidentified by as product X by IOD 702 but is actually product Y adjacent to price label Y (as depicted in the image), the user may simply ignore the exception upon viewing the image without having to travel to the location to verify the display in person. While this disruption to confirm the result is minimal, some environments may not desire such confirmation by on-site associates, wherein having an associate confirm an object detection result is optional. Conversely, due to the location of the robot 102 being corresponded to each image, if action is needed, the user may immediately know where to go and what to do, which as stated above tends to be the most difficult (i.e., time consuming) aspect of humans to maintain planogram, price tag, and catalog 212 compliance.

Another notable exception case includes low or out of stock items. Low stock items may be determined based on a reference planogram, which denotes the ideal arrangement of shelves/displays of products. The reference planogram may indicate the number of products to be displayed and how to arrange the display. Detecting, for instance, 10% (or other threshold based on user preference) of the maximum stock allowed by the planogram would produce a low stock exception. Such exception can be rapidly verified by a user viewing the image, enabling the user to rapidly identify the missing/low stock product to restock without having to travel to the display physically. In some embodiments, low stock may also be based on historical trend data, wherein a threshold for a low stock exception may be set at 10%, 20%, or other value from a maximum detected quantity of the item in the past, the maximum quantity should correspond to, at most, the maximum quantity in stock/displayed at any given time.

In some environments, operational concerns need to also be considered as products may have additional operational constraints around where they may be displayed. For instance, fertilizers should never be stored near food items, wherein both types of items may be determined by their department noted in the catalog 212. Similar non-compatible product display logic may be applied to any two or more products as a user desires (e.g., food/produce should never be displayed in the cleaning section). Another example may comprise refrigerated/frozen foods being detected anywhere outside of a refrigerator or freezer section, as these foods would rapidly spoil and be unsellable. Other safety/operational concerns may be denoted as exceptions, such as detecting a reserve storage pallet where it should not be (e.g., a reserve pallet placed upon a shelf not designed for reserve storage).

Once the exception analysis block 514 identifies the reported exceptions and filters the exclusions, the server 202 may produce an exception test results which records, for each item of the exception markup table 710, which became exceptions in the final report 716 and which were filtered from the report 716. The exception test results 712 may be further analyzed for frequency of repeated exclusions, wherein a high frequency of any given exclusion/exception may be flagged for further review. For instance, it may be the case that a particular product at a particular location constantly fails to be identified, which may indicate the IOD models are not properly configured to identify the item. A high number of invalid price or invalid expected price (catalog price) at a given location for a particular product may also indicate error in the catalog 212 or may be caused by an obfuscated/missing price label.

The report generation and delivery 516 block may aggregate the marked-up analytics 714, the exceptions, and exclusions of the exception test results table 712 to produce a final customer report 716. The final customer report 716 may contain the locations and quantity of detected products as well as all exceptions. Exclusions are not provided as these, if provided, are not actionable and may produce added confusion. In some instances, based on user preference and/or environment needs, the report may be broken down further. For instance, some environments may desire to have the identified products and their locations compared with a planogram and have any detected deviation from the planogram reported as an exception. Some environments may desire to have low stock reported, others may not. The report generation and delivery block 516 handles the feature data and detected exceptions and formats the data into a user-readable report in accordance with the environmental needs. Specific arrangements of the data (e.g., spreadsheets, tabulations, websites, etc.) are not of particular importance to the inventive concepts herein and may be based purely on user preference. The server 202 may store a copy of the report and communicate the report 716 to the end consumer device 208 (e.g., mobile phone, personal computer, etc.). Signal 718 may communicate the customer report 716 to the devices 208 of the desired recipients, which is credentialed to ensure proper delivery of the reports to the correct individuals while maintaining security.

In some instances, certain users may be provided with different reports than other users. For instance, a store associate of a chain of stores may be notified of misplaced, missing, or low stock exceptions whereas a regional manager of the chain may be provided with a change in inventory of certain products over time. After the aggregated analytics 708 has been verified, exclusions filtered, and exceptions denoted, one skilled in the art may arrange the information as they see fit for their environments and use case. Such arrangements may include, without limitation, a web portal, a spreadsheet or CSV file, a mobile application, and the like.

Advantageously the system shown and described in FIG. 7 enables quality assurance and verification of data reported in the customer report 716 without reliance on any source of data being ground truth. The system filters out exclusions which, if reported, would be largely useless while maintaining (possibly erroneous) detections which can be easily verified by a human and be actionable by the same or different humans, greatly increasing the workflow efficiency of that human by saving them effort in finding and detecting misplaced or low stock items themselves. That is, the system is configured to report possibly erroneous, yet verifiable, feature identifications while only excluding those which are not actionable to account for the data sources (i.e., IOD 702. OCR 704, catalog 212, etc.) not being ground truth. Additionally, what remains to be validated (i.e., the exceptions) can be validated and actioned on rapidly by simply viewing images detected to comprise the exceptions, rather than requiring the associates to identify these exceptions manually, which can be difficult in large environments containing thousands of products. That is, it is unreasonable (or at the very least, highly inefficient) to expect a human to remember planogram configurations, identify misplaced items, and improper prices as they walk around the environment. The robot 102 and server 202 can do so with a single pass by the shelf/display and are therefore able to notify humans of these exceptions thereby saving a substantial amount of time and effort in identifying exceptions which even the most knowledgeable humans could miss. Similarly, humans have exceptional abilities to identify objects from images, wherein feedback from humans to confirm or deny an IOD 702 prediction can be minimally disruptive to existing workflows.

Figure 8:
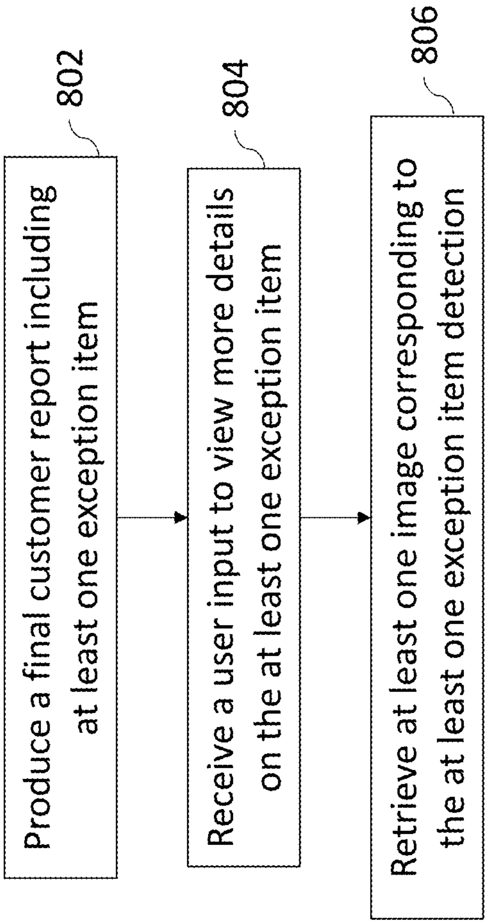
FIG. 8 is a process flow diagram illustrating a method for a user device to request more information to resolve a price tag mismatch, according to an exemplary embodiment.

FIG. 8 is a process flow diagram illustrating a process performed by either an application on a device 208 of a user receiving a customer report 716 or a web-based application hosted by a server 202, according to an exemplary embodiment. As discussed above in FIG. 7, once the report is generated and the feature identification data is validated, the end customer(s) may receive the report. Some customers/users may require different information than others in performing their job duties. For instance, a store associate tasked with stocking shelves may desire to know the current inventory, misplaced items, mispriced items, and/or low stock items. A manager of that store may desire more high-level information, such as temporal trends in inventory of certain items. Process 800 illustrates a method for a user to perform immediate actions from the customer report 716, namely in response to the detected exceptions.

Block 802 begins with the report generation and delivery block 516 producing a customer report 716. The customer report 716 comprises a tabulated list of identified products/items/features, locations where those features are identified, and a quantity detected. Some fields, called exceptions, may be missing information or susceptible to error from IOD 702. OCR 704, the catalog 212 containing errors, items being misplaced, and/or price labels being misplaced. Other exceptions may arise when the robot 102 fails to implement hardware states properly, such as deviating from scanning lines 406 by a threshold amount; failing to enable/disable lights, brushes, or other hardware features; navigating too fast/slow; and/or experiencing operation interruptions such as collisions, path blockages, or failing to scan a sufficient percentage of scannable faces.

A few immediately actionable cases can arise from these exceptions: out of stock detections, occurring when an item does not appear where it is expected to be, based on the catalog 212 or prior detections of the item at the location; location exceptions, where an item is found in a location where it is either not expected to be (e.g., based on a planogram or department information) or is non-compliant with proper storage (e.g., reserve pallets on a sales display); and price tag exceptions, when the price label adjacent to a detected object does not match the object or the price listed does not match the catalog 212 price. Out of stock detections are considered actionable as a human associate could restock the items to resolve the out of stock issue. Location based exceptions are similarly actionable as the associate could either (i) move the misplaced item, or (ii) verify the item was improperly detected by IOD 702 as another item via a displayed image or physically observing the location. Lastly, price tag exceptions are immediately actionable via replacing the price labels with the appropriate value. Depending on the end consumer, as discussed above, location based exceptions which occur when no expected location is provided in the catalog 212 may be desired to be excluded from the customer report 716 if the end-consumer of the report cannot adjust the catalog 212 to input an expected location.

In some embodiments, the customer report 716 including the noted exceptions are communicated to a device 208 of the user and stored locally on that device 208. In other embodiments, the device 208 requests access to the report 716 through the server 202 which hosts the report 716 data, wherein the device 208 may execute a local application to communicate with the server 202.

Block 804 includes either the device 208 or server 202 (via the device 208) receiving a user input to view more details on at least one exception item. For instance, the report 716 may comprise a section tabulating all the noted price tag exceptions. The user may click, tap, or otherwise select one line item to view more information about the detection of the item.

Block 806 includes the device 208 or server 202 retrieving at least one image corresponding to the selected at least one exception item chosen in block 804. The user may then view the IOD 702 and OCR 704 predictions, the referenced item in the catalog 212, a location (e.g., (x,y), face ID, bin number, etc.), and most importantly the image captured by the robot 102 to produce the predictions. In some embodiments, the images captured by the robot 102 are stitched together to form a panoramic view of a face of a scannable object, wherein the panoramic view may be provided to the user in response to the input. The image and/or panoramic views may further include bounding boxes projected thereon which denote the image space occupied by the detected item, as well as denote the item either by SKU, GTIN, name, or hyperlink to the catalog 212 (e.g., as shown in FIG. 4C). In some instances, the bounding boxes may be toggled on and off by user input.

Advantageously, being provided with an image that highlights the exceptional item(s) in the image space greatly reduce the time spent by associates in detecting these exception cases. As discussed above, humans have limited memory and recalling planogram arrangements and price values for hundreds, or thousands, of items is nearly impossible, however if provided with a reference planogram and prices and a substantially reduced search field (e.g., such as knowing a space on a specific shelf/bin/display which contains an issue) the time spent by the human on detecting exception cases is reduced substantially. Effectively, the robot 102 and server 202 contain the reference planograms and price data and can recall them with perfect memory and therefore are able to greatly reduce the search field for the humans in detecting price tag exceptions. A human, provided with a location on a shelf (e.g., via bin number, shelf level, and the bounding box location in image space), an image of the item in question, and a hyperlink to the catalog 212 for the item can immediately and virtually recognize if the item is misplaced (i.e., does not correspond to the adjacent price label), mispriced, is low stock, or is proper (i.e., that IOD 702 or OCR 704 are incorrect).

According to at least one non-limiting exemplary embodiment, the user may be further requested to verify if the exception was properly or improperly reported. For example, the device 208 may display a prompt requesting the user to verify if the feature/object was properly identified (i.e., a simple yes/no prompt). This feedback may be utilized to further train IOD 702 or OCR 704 models used to predict what the imaged features are. IOD 702 typically fails when the input image depicts the subject substantially differently from the training data, such as under different lighting conditions, perspectives, sizes, etc., wherein receiving feedback on these failure cases may provide valuable edge case training for the IOD 702 models to reduce false positive exception detections in the future. Additionally, if the identified exception is a correctly identified misplaced item, the associate may provide feedback indicating the misplaced item was moved, which can remove the identification from being a reported exception.

Figure 9:
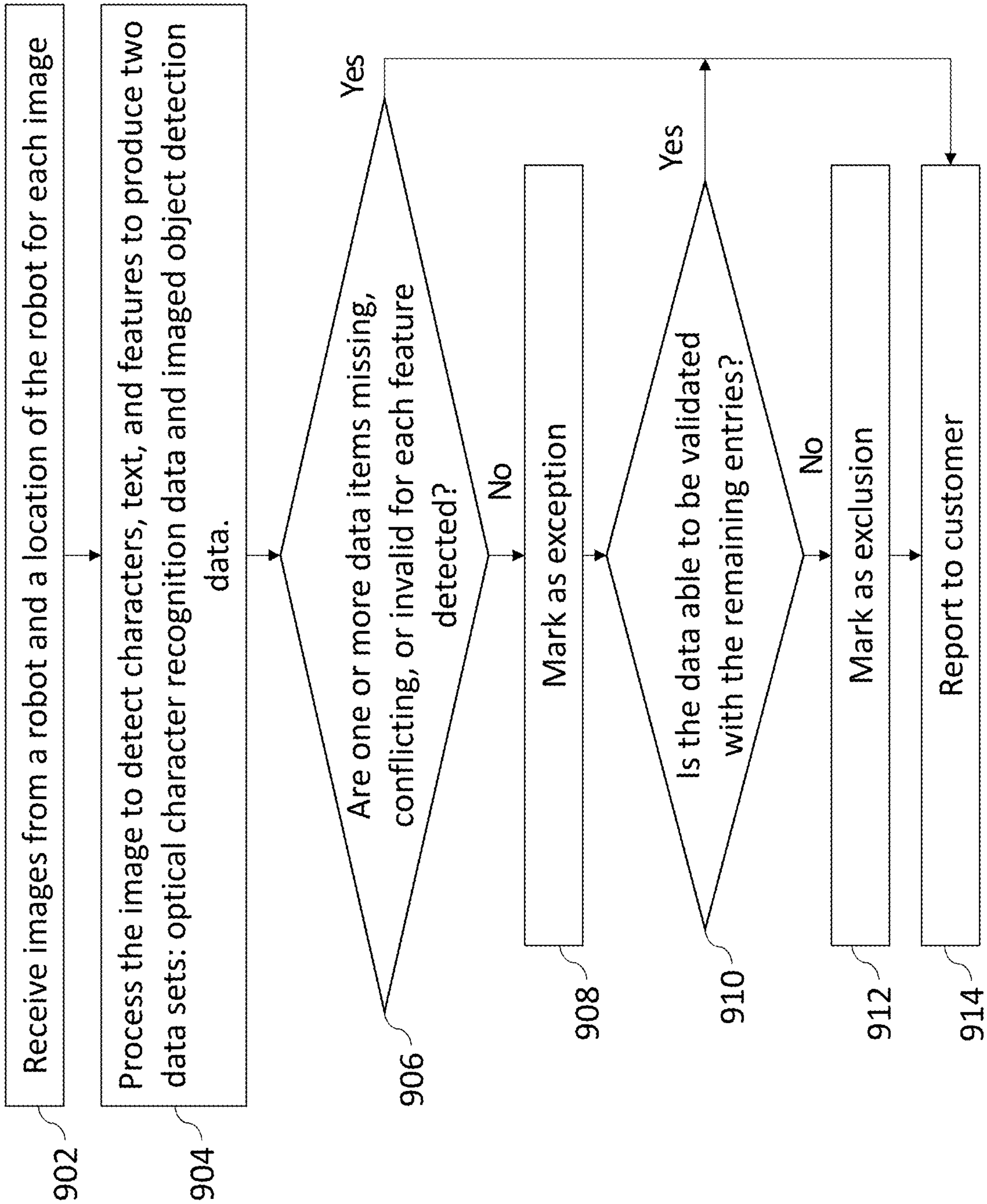
FIG. 9 is a process flow diagram illustrating a method for filtering exclusions and identifying exceptions in an inventory report, according to an exemplary embodiment.

FIG. 9 is a process flow diagram outlining the process from intake of images from a robot 102, marking up exception detections, and filtering exclusions from a customer report 716, according to an exemplary embodiment. Steps of method 900 may be effectuated via a processor of a server 202 or device 208 executing computer readable instructions from a memory. Certain step(s) that require specifically the server 202 or device 208 to execute the step(s) will be noted, otherwise either device 208 or the server 202 processor(s) may perform the steps of method 900.

Block 902 begins with the server 202 receiving images from a robot 102. In some cases, the images are uploaded in batches, such as a batch of all images captured during a specific route execution or within a specified time range. In some cases, the images are uploaded automatically as they are captured, assuming the robot 102 maintains communication with the server 202 via a network such as Wi-Fi or cellular/LTE. These images are appended with metadata corresponding to the location of the robot 102 when the images were captured. The location information may include site identifier (i.e., an identifier for the store, building, or overall environment), an (x,y) location of the robot 102, a department (if provided), an annotated object 402 identifier for the object 402 being scanned in the image, a bin of the object 402 being scanned in the image (if provided), and shelf level information (if provided), such as the number of shelves and/or the heights of the shelves.

Block 904 includes the server 202 processing the images to detect characters, texts, and features to produce at least two data sets: optical character recognition data (i.e., OCR 704) and imaged object detection data (i.e., IOD 702). The server 202 may process the images using one or more models, such as those derived from (convolutional) neural networks, refer to databases, or other models configured to either detect and read texts or identify objects based on how they appear in the image. In some embodiments, the server 202 may communicate the images to an external server for processing thereon, wherein the external server or entity returns one or both data sets. In some embodiments, a plurality of external analytics services can provide the data sets. The OCR 704 will return text detected on price labels, including listed prices and descriptions, as well as any text detected on the packaging or item itself. In some embodiments, the detected text on the items themselves and not on the price labels can be provided to the IOD process to further inform the prediction.

After processing the images to detect features and text, each detected feature is provided in an aggregated analytics table 708 as a line item. For each line item, the IOD 702 and OCR 704 results are appended thereto alongside location information, reserve storage information, reference to a catalog 212. SKU/GTIN/UPC codes, description information, listed price, and expected price (from catalog 212). Block 906 includes the server 202 determining if one or more line items in the aggregated analytics table 708 includes invalid, missing, or conflicting data regarding the feature being detected. Missing or invalid data can be quickly verified via a Boolean mask applied to each entry missing per line item. For instance, certain columns of the aggregated analytics table 708 may be missing or invalid (e.g., UPC with improper length, a face ID value missing, a product description not found in the catalog 212, etc.), thereby producing a value of zero for the bitmask and one elsewhere (or vice versa). Conflicting data arises when any two entries of a line item correspond to different items. For instance, IOD 702 detecting a box as "cereal A" while OCR 704 reads a label for "cereal B". Another example may arise when the description does not match any item in the catalog 212, or when the description detected by OCR 704 is different from the description for another item in the catalog which was detected by IOD 702. Other cases of conflict may arise due to operational concerns, such as detecting frozen/refrigerated foods outside of a freezer/refrigerator or detecting safety hazards (e.g., apples adjacent to pesticides). Such operational conflicts can be encoded within the annotation information, wherein the exception aspect 426 may further contain a list of products or types of products which should not be found in certain objects 402 (e.g., all "grocery" department products being excluded from all "hardware", "cleaning", etc, departments/objects 402). These operational conflicts are notable cases beyond simply being misplaced items as there may be safety and/or operational efficiency concerns which should be denoted separately.

According to at least one non-limiting exemplary embodiment, frequency of occurrence may generate an exception if a single item (i.e., the same UPC/SKU) is detected above a threshold number of times at a given location. All these repeated detections may be marked as exceptions.

If, for a given line item, the line item contains missing, conflicting, or invalid entries, the line item is marked as an exception in block 908. Otherwise, the line item is reported to the customer in block 914.

Block 910 includes the server 202 determining if, for each exceptional item, the line item should be reported to the consumer. An exception should be removed (i.e., become an exclusion) if the remaining data, assuming it is correct, cannot be verified in person by a human. For instance, missing a UPC for a product detected at a location may require a human to search for an unknown product. As another example, if location information is missing or invalid, the human may be required to search the entire store for an item which is nonsensical. In the opposing case, misplaced items can arise from conflicts between IOD 702 and OCR 704, wherein a human simply viewing the image may determine if (i) the price tag is incorrect. (ii) an item is misplaced, or (iii) feature detection predictions (i.e., IOD or OCR) are erroneous. As another example, if the detected price on the label read by OCR disagrees with the catalog price, the item becomes a price tag exception due to the listed price being potentially noncompliant with the catalog price, wherein the human may (assuming all other data entries are valid, namely, location) verify the physical tag is non-compliant with the catalog 212 or if OCR misread a character.

As discussed above, the columns or entries for each line item, and their validity or correspondence with other entries, can form a Boolean mask. This Boolean mask can then be utilized to implement the above logic as needed to fit certain environmental needs.

If the remaining data of the line item cannot be verified in person, the item is marked as an exclusion and filtered from the final customer report in block 912. Otherwise, the exceptions remain as noted exceptions in the final customer report produced and are transmitted to the customer in block 914.

Figure 10:
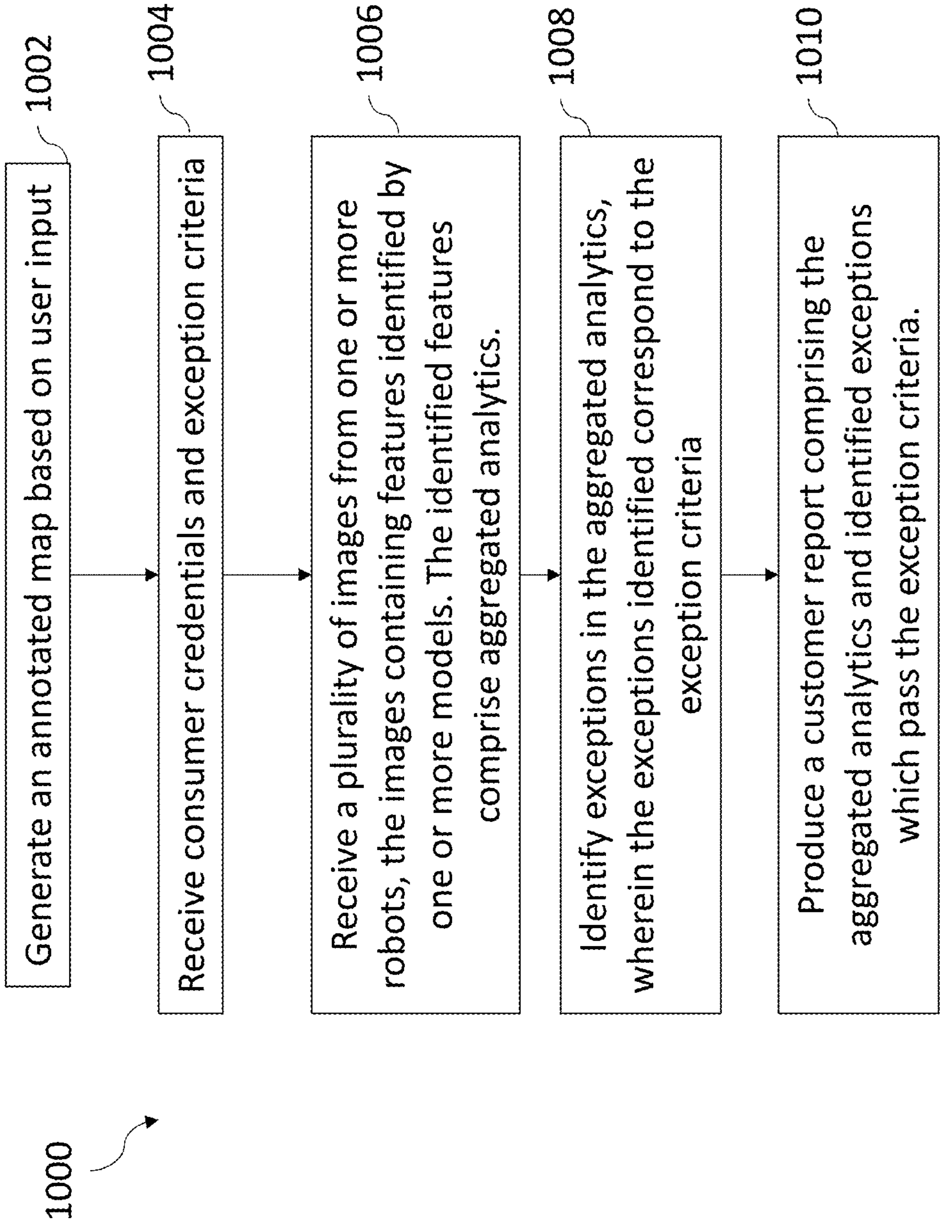
FIG. 10 is a process flow diagram illustrating a method for a server to configure a feature detection report to contain exceptions pertinent to an end consumer, according to an exemplary embodiment.

FIG. 10 is a process flow diagram illustrating a method 1000 for a server 202 to produce a customer report 716, according to an exemplary embodiment. Steps of method 1000, unless specified otherwise, may be executed via processors of the server 202 executing instructions from a non-transitory memory, or may be executed via processors of devices 208 and/or robots 102 in a distributed manner (i.e., cloud computing).

First, in block 1002, the server 202 generates an annotated map based on a user input. The user(s) providing the input do not need to be the same individual(s) who receive the final customer report 716. The user(s) providing input may also be at a location separate from the environment of the map. As discussed above for FIG. 4A-C, the server 202 may retrieve a map of an environment from one or more robots 102. The map may comprise a combination of multiple maps produced by a plurality of robots 102 or by a single robot 102 executing multiple different routes. The map should at least include every object desired to be scanned for features. In some embodiments, the server 202 may automatically store the most up-to-date versions of maps produced by the robots 102 such that the maps can be accessed when the robots 102 are powered off or lacking connectivity to the server 202.

The map annotations 404 may be provided to the server 202 via a device 208, preferably a personal computer or tablet but may be implemented onto a mobile device as well without limitation. The device 208 may execute an application to add, delete, or change annotations provided on the map using a graphical user interface. In other embodiments, a web portal may be utilized for similar functionality. The annotations 404 provided include at least a semantic aspect 422, corresponding to a human-readable label for the object, and a designation of at least one scannable face on the object. Each of the at least one sides or faces of the object to be scanned are specified with a face ID. Each scannable face is configured to include functional aspects 424, corresponding to robotic behavior required to scan the object face as shown in FIG. 4C, and exception information 426, which will be configured in the next block 1004.

Block 1004 includes the server 202 receiving consumer credentials and exception criteria. As discussed above, the information reported may depend on the user who is consuming the report. For example, an in-store associate may be able to fix an incorrect price tag, however a regional manager may not be able to. Conversely, an item catalog 212 including a missing entry (e.g., missing expected location/department) is not actionable by the in-store associate but is actionable by the regional manager. Accordingly, block 1004 receives an input which configures different filters for different consumers. The input may comprise, in some embodiments, a selection from one more pre-determined filters which either include or exclude certain exceptions from being reported. The filters may include any of the exception cases discussed herein including, but not limited to, price tag non-compliance (i.e., incorrect posted price), planogram non-compliance (i.e., incorrect shelf/display layout), out of stock, location-based exceptions (i.e., wrong department or storage method), invalid SKU/GTIN/UPC exceptions, invalid price tag reads (e.g., $0, or unreasonably high prices), conflicting IOD 702 and OCR 704 results, low confidence IOD 702 and/or OCR 704 results, and/or frequency based exceptions (e.g., detecting too many of a single item, or detecting a very small amount of an item in an unexpected location). Based on the consumer preference and credentials, the server 202 receives an input comprising a selection of one or more of these cases to be included in the report 716.

Block 1006 includes the server 202 receiving a plurality of images from one or more robots, the images containing features to be identified by one or more models. More specifically, the images analyzed by the models correspond to only the annotated scannable faces provided in block 1002. The at least two models discussed herein, IOD 702 and OCR 704, are utilized to analyze the image and generate predictions as to what is depicted. IOD 702 generates predictions based on how objects physically appear, such as via analyzing shapes, contours, patterns, etc, and/or based on prior training of, e.g., convolutional neural networks or other feature detection model. OCR 704 identifies and reads text in the images, specifically the text on price labels. OCR 704 may, in some cases, further identify and read text on the items themselves which may aid in IOD 702 predictions, but this is not a requirement and IOD 702 may generate predictions independently. In some embodiments, a scheduler 510 is utilized to determine when and how many images to process for feature identification, wherein the scheduler 510 may analyze batches of images such as after every day, after a number of hours/minutes, after execution of a route, after scanning a threshold number of scannable faces, and/or for each image captured by the robot 102 (i.e., a live stream of individual images). Since the robot 102 localizes itself and therefore localizes the images on the map, the locations of features detected within the images may be projected onto the map. Further, since the object being scanned is annotated, the identified features may readily be assigned to more general identifiers than an (x,y) coordinate, such as "item A was detected N times in "Home Goods 1" face 2". Although described semantically, aggregated analytics may be in the form of a table or spreadsheet which may be organized per annotated object (e.g., a table of all detected features for "home goods 1"), by face (e.g., a table of all detected features for "face 2" of "home goods 1"), or by department (e.g., a table of all detected features for all annotated objects within the department).

Block 1008 includes the processors of the server 202 identifying exceptions in the aggregated analytics in accordance with the exception criteria specified above in block 1004. The exceptions discussed herein may each require individual unit tests on the aggregated analytics. For example, price tag non-compliance requires comparing OCR 704 results with an expected price in a catalog 212 and, if the OCR 704 does not match, identifying the feature detection result as a price tax non-compliance exception. As another example, missing items or low stock exceptions may be based, in part, not detecting a feature where it is supposed to be, based on planogram, catalog 212 data, or prior detections of the feature at the location. These and other tests described herein to identify exception cases may be employed or disabled based on the exception criteria specified by the user. For example, if an end consumer does not desire to have missing/low stock exceptions be reported, the test for low stock items is not executed.

According to at least one non-limiting exemplary embodiment, the server 202 may execute all unit tests for all exception cases and, after identifying the exception cases, removing one or more from the final customer report 716 based on the exception criteria. While performing all exception analysis 514 tests may require additional computational recourses to process the images received by the robot 102, it may be desirable to maintain the information regardless.

Block 1010 includes the processors of the server 202 producing a customer report comprising the aggregated analytics 708 and identified exceptions. The customer report 716 may contain different information and reported exceptions for certain individuals or user categories (e.g. store associates, store managers, or shoppers, etc.) based on the exception criteria specified above. The customer report 716 may include a list of all detected features and detected exceptions either combined, in two separate tables/files, on a web-based portal, or via an application executed via a device 208. In embodiments, a customer report containing all exceptions may be generated, followed by applying filters to limit exception reports to produce final customer reports based on the credential criteria assigned in block 1004. In other embodiments, the credential filters may be applied in block 1008 and a plurality of customer reports may be produced in step 1010.

Figure 11:
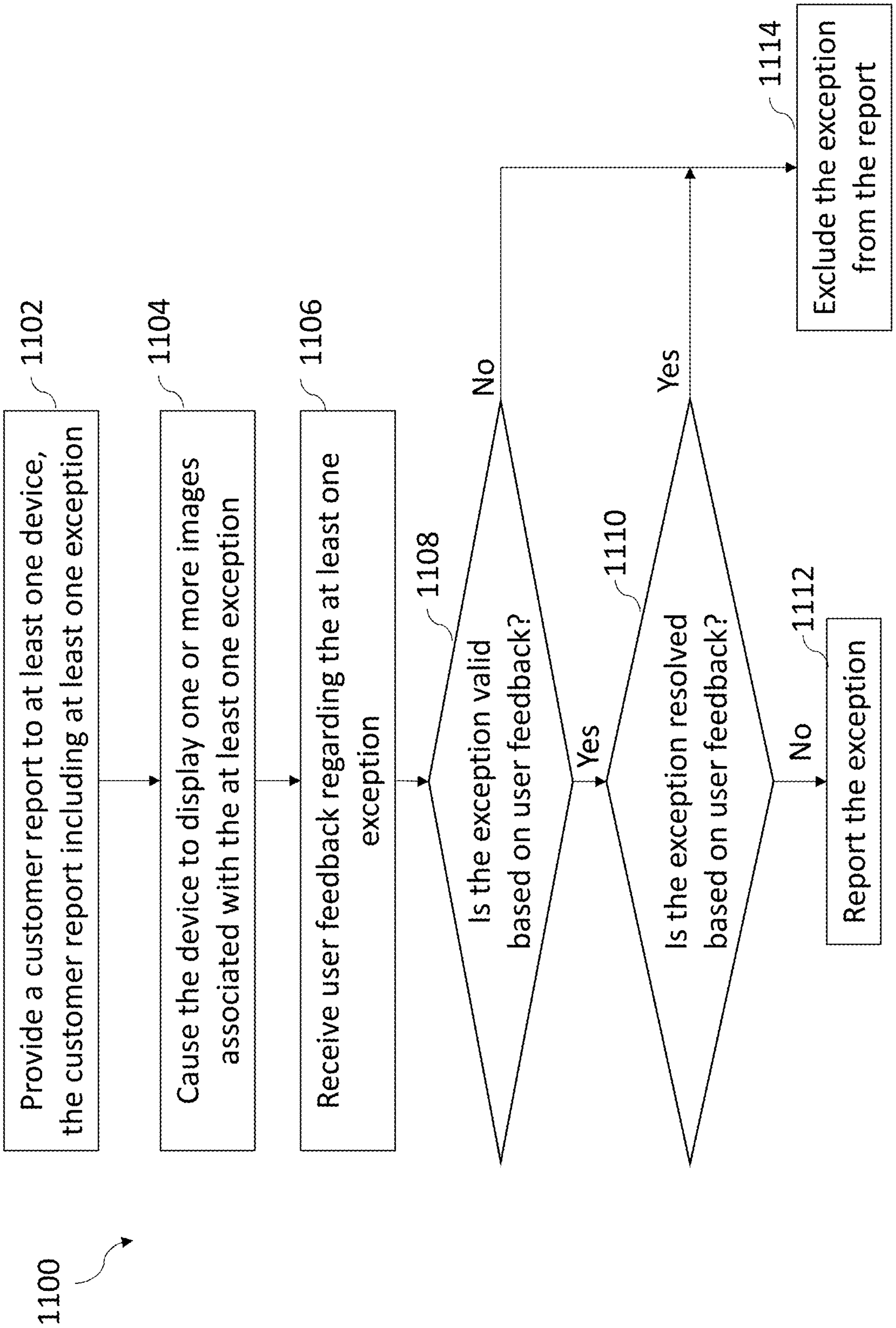
FIG. 11 is a process flow diagram illustrating a method for a server to receive user feedback and adjust a feature detection report, according to an exemplary embodiment.

FIG. 11 is a process flow diagram illustrating a method 1100 for processors of a server 202 to provide a customer report 716 and receive feedback regarding one or more exceptions, according to an exemplary embodiment. Steps of method 1100, unless specified otherwise, may be executed via processors of the server 202 executing instructions from a non-transitory memory, or may be executed via processors of devices 208 and/or robots 102 in a distributed manner (i.e., cloud computing).

Block 1102 includes the processors of the server 202 providing a customer report 716 to at least one device 208. The report 716 includes, in part, at least one exception.

Block 1104 includes the processors of the server 202 causing the device 208 to display one or more images associated with the at least one exception. The one or more images may be displayed upon a user clicking, tapping, or otherwise selecting one or more exceptions for additional information, such as via a web-based portal or mobile application. In some embodiments, the one or more images displayed are provided by the server 202 upon request, whereas in other embodiments the images are downloaded as part of the customer report 716 and stored locally on the device 208.

Block 1106 includes the server 202 receiving a feedback signal regarding the at least one exception. In some embodiments, the feedback signal includes two parts: validation and resolution. A validation feedback signal corresponds to a user of the device 208 confirming or denying the validity of a detected exception. In other words, the user confirms that the exception was properly identified or is a misidentification by the system. A resolution feedback signal corresponds to the user of the device 208 indicating that the issue which generated the exception has been resolved. Resolving the exception includes adjusting the environment such that the exception would not be generated again for the same location or feature, such as via replacing missing items, moving misplaced items, adjusting price labels to correct values, adjusting displays based on a planogram, and the like.

In some cases, validation and resolution feedback signals may arrive at different times and in other cases they may arrive at the same time. Blocks 1108 and 1110 illustrate the processor of the server 202 first determining if the exception is valid. If the exception is improperly detected, the processor moves to block 1114 and excludes the entry from the customer report 716 and no further action or feedback is needed. If the exception is properly detected, as determined via user feedback, the processors move to block 1110. Block 1110 includes the server 202 determining if the exception has been resolved based on the user feedback. If the exception has been resolved, the entry is removed from the customer report 716 in block 1114. If the exception has not been resolved, it remains in the customer report 716.

To illustrate blocks 1108-1114 via an example, in the case of an improper price label the user of the device 208 may be provided with the image captured by the robot 102 of the alleged improper price label. The server 202 may also provide the expected price value from the catalog 212 for comparison. The user may confirm the price is in fact incorrect and provide such confirmation as feedback. Alternatively, the user may decide that OCR 704 misread the price label and deny the exception as valid, wherein no further action is needed. Upon correcting the price label in the environment, the user may provide further feedback via the device 208 indicating the exception has been resolved, wherein the exception is removed from the final report. Alternatively, if no action is made to correct the price label, the incorrect price label remains reported. Similarly, for misplaced items, an image of an alleged misplaced item is provided to the device 208, the user of the device 208 may confirm the exception is correctly identified or deny the exception as valid. The user may, if the exception is correctly identified, replace the item in its correct expected location and provide additional feedback, via device 208, indicating the exception is resolved. If the user cannot resolve the exception, the exception remains in the report 716 until it is either resolved, as indicated via feedback signals, or re-scanned later. Accordingly, since there is no longer a misplaced item, the exception is removed from the customer report 716.

Advantageously, feedback signals may enable the customer report 716 to be updated in real time as robots 102 collect new data of the environment and humans correct exceptions detected by the robot 102 and sever 202 system. By removing resolved exceptions or invalid exceptions from the customer report 716, the report 716 may be accessed at any time and indicate any currently outstanding exception cases.

In embodiments, one or more images obtained after the image associated with the at least one exception in block 1104 may indicate that an exception has been resolved. For example, an image with a "misplaced" item may be identified as an image with a misplaced item exception in block 1104. A later image may show the "misplaced" item is not in the later image. The processor may determine that the exception determined in block 1104 is resolved even without user feedback in block 1110 and exclude the exception from the report. This may be advantageous to reduce the number of exceptions in a customer report 716 that does not need to be accessed in real time.

It will be recognized that while certain aspects of the disclosure are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed embodiments, or the order of performance of two or more steps permuted. All such variations are encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including." "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A system configured to identify exceptions in product displays, comprising:

a robot comprising at least one sensor configured to take images of objects as the robot travels in an environment, each image acquired by the robot is localized by a controller thereon;

at least one user device; and a server in communication with the robot and at least one user device, the server comprises at least one processor configured to execute computer readable instructions to:

receive the images of objects and associated localization data for the images from the robot, the images depict at least one feature to be identified, the images corresponded to a location of the robot measured by the robot during acquisition of the images;

generate a first data set comprising image object detection predictions for each of the at least one features to be identified within the image based on visual characteristics of the at least one features using a first detection model, the image object detection predictions include at least a product identification and location for each of the at least one features;

generate a second data set comprising optical character recognition predictions for each of the at least one features to be identified within the image based on text depicted on price labels within the image using a second detection model, the predictions include at least a price value and a product identification for each of the at least one features;

receive a third data set corresponding to a catalog, the catalog indicates an expected arrangement, location, and price values of features within the environment;

identify at least one exception, the at least one exception being any one or more of: (i) a discrepancy between the product identifications in the first and second data sets, (ii) a discrepancy between the product identifications in the first and second data sets and products in the catalog; (iii) a discrepancy between the price values in the second data set with the price values in the catalog;

generate a report comprising a list of identified features and the at least one exception; and communicate the report to a user device.

2. The system of claim 1, wherein the at least one processor of the server is further configured to execute the computer readable instructions to:

identify exclusions if at least one of following fields corresponding to each of the at least one features is missing or invalid: (i) site location; (ii) robot location; (iii) annotation information associated with the object being scanned; (iv) bin information; (v) UPC, SKU, or GTIN values for the product identifications; or (vi) description of an item.

3. The system of claim 1, wherein the at least one processor of the server is further configured to execute the computer readable instructions to:

receive annotations to a computer readable map of an environment of the robot, the annotations define on the computer readable map are encompassed by objects to be scanned for features, each area includes at least one face on its perimeter, each face is assigned a face identifier ("ID") value;

receive configurations for each face ID of each of the objects to be scanned, wherein the configurations denote semantic information, functional information, and exception information associated with the face ID;

wherein the annotations are received via a user interface coupled to the device, server, or robot.

4. The system of claim 3, wherein the exception information contains a reserve storage field; and an exception is generated for an identified feature if the feature is a reserve storage item which is detected where the exception information indicates reserve storage should not be present, or vice versa, based on either the first or second data sets.

5. The system of claim 3, wherein the configurations includes a department information field; and the at least one processor of the server produces an exception for a detected feature if the detected feature cannot be stored or displayed in the department, the departments in which certain features can or cannot be present are denoted by a catalog provided to the server via the annotations.

6. The system of claim 1, wherein the at least one processor of the server is further configured to execute the computer readable instructions to:

provide at least one image captured by the robot to the device upon the device requesting to view one or more noted exceptions in more detail via a user interface of the device.

7. The system of claim 1, wherein the at least one processor of the server is further configured to execute the computer readable instructions to:

compare a location of the at least one feature to a reference planogram, the reference planogram being retrieved based in part on the location of the robot during acquisition of the images; and generate an exception for any of the at least one features comprise locations different from their denoted location in the reference planogram.

8. A method for identifying exceptions in product displays, comprising:

a server comprising at least one processor configured to execute computer readable instructions to perform steps of:

receiving an image of objects and associated localization data for the image from a robot comprising at least one sensor configured to take images of objects as the robot travels in an environment and a controller configured to localize the image as it is taken, wherein the image depicts at least one feature to be identified, the images corresponded to a location of the robot measured by the robot during acquisition of the images;

generating a first data set comprising image object detection predictions for each of the at least one features to be identified within the image based on visual characteristics of the at least one features using a first detection model, the image object detection predictions include at least a product identification and location for each of the at least one features;

generating a second data set comprising optical character recognition predictions for each of the at least one features to be identified within the image based on text depicted on price labels within the image using a second detection model, the predictions include at least a price value and a product identification for each of the at least one features;

receiving a third data set corresponding to a catalog, the catalog indicates an expected arrangement, location, and price values of features within the environment;

identifying at least one exception being any one or more of: (i) a discrepancy between the product identifications in the first and second data sets, (ii) a discrepancy between the product identifications in the first and second data sets with products in the catalog; (iii) a discrepancy between the price values in the second data set with the price values in the catalog;

generating a report comprising a list of identified features and the at least one exception; and communicating the report to a user device.

9. The method of claim 8, further comprising the at least one processor to execute the computer readable instructions to perform the step of, identifying exclusions if at least one of following fields corresponding to each of the at least one features is missing or invalid: (i) site location; (ii) robot location; (iii) annotation information associated with the object being scanned; (iv) bin information; (v) UPC, SKU, or GTIN values for the product identifications; or (vi) description of an item.

10. The method of claim 8, further comprising the at least one processor to perform the steps of, receiving annotations to a computer readable map of an environment of the robot, the annotations defining on the computer readable map are encompassed by objects to be scanned for features, each area includes at least one face on its perimeter, and each face is assigned a face identifier ("ID") value; and receiving face configurations for each face ID of each of the objects to be scanned, the configurations denoting semantic information, functional information, and exception information associated with the face ID; wherein the annotations are received via a user interface coupled to the device, server, or robot.

11. The method of claim 10, wherein, the exception information contains a reserve storage field; and the method comprises generating an exception for an identified feature if the feature is a reserve storage item which is detected where the exception information indicates reserve storage should not be present, or vice versa based on either the first or second data sets.

12. The method of claim 10, wherein, the configurations includes a department information field; and the method further comprises producing an exception for a detected feature if the detected feature cannot be stored or displayed in the department, the departments in which certain features can or cannot be present are denoted by a catalog provided to the server via the annotations.

13. The method of claim 8, further comprising the at least one processor of the server providing at least one image captured by the robot to the device upon the device requesting to view one or more noted exceptions in more detail via a user interface of the device.

14. The method of claim 8, further comprising the at least one processor of the server comparing a location of the at least one feature to a reference planogram, the reference planogram being retrieved based in part on the location of the robot during acquisition of the images; and generating an exception for any of the at least one features comprise locations different from their denoted location in the reference planogram.

15. A non-transitory computer readable storage medium having a plurality of computer readable instructions stored thereon which, when executed by at least one processor in communication with a robot, configure the at least one processor to identify exceptions in product displays by executing instructions to, receive at least one image and associated localization data from the robot, wherein the robot comprises at least one sensor configured to take images of objects as the robot travels in an environment, wherein each image acquired by the robot is localized by a controller thereon and each image depicts at least one feature to be identified and corresponds to a location of the robot measured by the robot during acquisition of the image;

generate a first data set comprising image object detection predictions for each of the at least one features to be identified within the image based on visual characteristics of the at least one features using a first detection model, the image object detection predictions include at least a product identification and location for each of the at least one features;

generate a second data set comprising optical character recognition predictions for each of the at least one features to be identified within the image based on text depicted on price labels within the image using a second detection model, the predictions include at least a price value and a product identification for each of the at least one features;

receive a third data set corresponding to a catalog, the catalog indicates an expected arrangement, location, and price values of features within the environment;

identify at least one exception being any one or more of: (i) a discrepancy between the product identifications in the first and second data sets, (ii) a discrepancy between the product identifications in the first and second data sets with products in the catalog; (iii) a discrepancy between the price values in the second data set with the price values in the catalog;

generate a report comprising a list of identified features and the at least one exception; and communicate the report to a user device.

16. The non-transitory computer readable storage medium of claim 15, wherein the at least one processor is further configured to execute the computer readable instructions to:

identifying exclusions if at least one of following fields corresponding to each of the at least one features is missing or invalid: (i) a robot location; (ii) annotation information associated with the object being scanned; (iii) bin information; (iv) UPC, SKU, or GTIN values for ethe product identifications; (v) site location; or (vi) description of an item.

17. The non-transitory computer readable storage medium of claim 15, wherein the at least one processor is further configured to execute the computer readable instructions to:

receive annotations to a computer readable map of an environment of the robot, the annotations defined on the computer readable map are encompassed by objects to be scanned for features, each area includes at least one face on its perimeter, each face is assigned a face identifier ("ID") value;

receive face configurations for each face ID of each of the objects to be scanned, wherein the configurations denote semantic information, functional information, and exception information associated with the face ID; wherein the annotations are received via a user interface in communication with the device, server, or robot.

18. The non-transitory computer readable storage medium of claim 17, wherein the exception information contains a reserve storage field; and the at least one processor is further configured to execute the computer readable instructions to generate an exception for an identified feature if the feature is a reserve storage item which is detected where the exception information indicates reserve storage should not be present, or vice versa based on either the first or second data sets.

19. The non-transitory computer readable storage medium of claim 17, wherein the configurations includes a department information field; and the at least one processor of the server produces an exception for a detected feature if the detected feature cannot be stored or displayed in the department, the departments in which certain features can or cannot be present are denoted by a catalog provided to the server via the annotations.

20. The non-transitory computer readable storage medium of claim 15, wherein the at least one processor is further configured to execute the computer readable instructions to:

provide at least one image captured by the robot to the device upon the device requesting to view one or more noted exceptions in more detail via a user interface of the device.

21. The non-transitory computer readable storage medium of claim 15, wherein the at least one processor is further configured to execute the computer readable instructions to:

compare a location of the at least one feature to a reference planogram, the reference planogram being retrieved based in part on the location of the robot during acquisition of the images; and generate an exception for any of the at least one features comprise locations different from their denoted location in the reference planogram.

22. The non-transitory computer readable storage medium of claim 15, wherein the at least one processor is further configured to execute the computer readable instructions to:

receive a first feedback signal from the device, the feedback signal indicates one or more exceptions of the at least one exception is valid or invalid;

remove the one or more exceptions which are invalid from the report;

receive a second feedback signal from the device, the second feedback signal indicates if the one or more valid exceptions has been resolved;

remove the valid exceptions which have been resolved from the report.

23. The non-transitory computer readable storage medium of claim 15, wherein, the identified exceptions are based on exception criteria provided to the at least one processor, the exception criteria including a list of exceptions to include in the report.

* * * * *